United States Patent
Black et al.

(10) Patent No.: US 8,472,322 B2
(45) Date of Patent: Jun. 25, 2013

(54) METHOD AND APPARATUS FOR ADAPTIVE DELAY MANAGEMENT

(75) Inventors: Peter J. Black, San Diego, CA (US); Mehmet I. Gurelli, San Diego, CA (US); Mehmet Yavuz, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1056 days.

(21) Appl. No.: 11/123,479

(22) Filed: May 5, 2005

(65) Prior Publication Data
US 2005/0281278 A1 Dec. 22, 2005

Related U.S. Application Data

(60) Provisional application No. 60/568,650, filed on May 5, 2004, provisional application No. 60/625,660, filed on Nov. 4, 2004.

(51) Int. Cl.
*H04J 3/14* (2006.01)
*H04L 12/56* (2006.01)

(52) U.S. Cl.
USPC ........................................ 370/235; 370/395.4

(58) Field of Classification Search
USPC ................. 370/465, 395.4, 468, 231, 235
See application file for complete search history.

(56) References Cited

U.S. PATENT DOCUMENTS

| | | | |
|---|---|---|---|
| 5,278,828 A | 1/1994 | Chao | |
| 5,859,835 A | 1/1999 | Varma et al. | |
| 5,999,931 A | 12/1999 | Breitbart et al. | |
| 6,126,463 A | 10/2000 | Okazaki et al. | |
| 6,205,150 B1 | 3/2001 | Ruszczyk | |
| 6,338,078 B1 | 1/2002 | Chang et al. | |
| 6,493,331 B1 | 12/2002 | Walton et al. | |
| 6,590,890 B1 * | 7/2003 | Stolyar et al. | 370/349 |
| 6,611,522 B1 | 8/2003 | Zheng | |
| 6,820,128 B1 * | 11/2004 | Firoiu et al. | 709/233 |
| 6,990,113 B1 | 1/2006 | Wang et al. | |

(Continued)

FOREIGN PATENT DOCUMENTS

| | | |
|---|---|---|
| JP | 2000204575 | 7/2000 |
| JP | 2002135329 A | 5/2002 |

(Continued)

OTHER PUBLICATIONS

Vishal Phirke, "Traffic Sensitive Active Queue Management for Improved Quality of Service," May 2002, Worcester Polytechnic Institute, http://www.wpi.edu/Pubs/ETD/Available/etd-0507102-202519.*

(Continued)

*Primary Examiner* — Dang Ton
*Assistant Examiner* — Ryan Kavleski
(74) *Attorney, Agent, or Firm* — Charles E. Eggers

(57) ABSTRACT

Adaptive delay management means and method for allocating resources having different Quality of Service (QoS) requirements. A Forward Link (FL) scheduler prepares transmission instances by treating pending data queues according to a priority class, such as Best Effort (BE) and Expedited Forwarding (EF). Data bits from multiple queues are stuffed into a transmission instance. Various metrics are used to generate a set of candidates for transmission and then select and build a next transmission instance from the set of candidates.

58 Claims, 12 Drawing Sheets

U.S. PATENT DOCUMENTS

| | | | |
|---|---|---|---|
| 7,000,026 | B2 | 2/2006 | Beshai et al. |
| 7,006,472 | B1* | 2/2006 | Immonen et al. ............ 370/332 |
| 7,050,447 | B2 | 5/2006 | Silverman et al. |
| 7,085,847 | B2 | 8/2006 | Darnell et al. |
| 7,212,534 | B2 | 5/2007 | Kadambi et al. |
| 7,266,087 | B2 | 9/2007 | Wahl |
| 7,280,473 | B2 | 10/2007 | Wu et al. |
| 7,327,729 | B2 | 2/2008 | Kawaguchi et al. |
| 7,457,241 | B2 | 11/2008 | Basso et al. |
| 2002/0012332 | A1* | 1/2002 | Tiedemann et al. ......... 370/335 |
| 2002/0036984 | A1* | 3/2002 | Chiussi et al. ................ 370/232 |
| 2002/0040381 | A1 | 4/2002 | Steiger et al. |
| 2002/0085567 | A1 | 7/2002 | Ku |
| 2002/0141362 | A1* | 10/2002 | Hsu et al. ...................... 370/331 |
| 2002/0183066 | A1* | 12/2002 | Pankaj .......................... 455/453 |
| 2003/0039213 | A1* | 2/2003 | Holtzman et al. ............ 370/252 |
| 2003/0081627 | A1* | 5/2003 | Bao et al. ...................... 370/444 |
| 2003/0096597 | A1* | 5/2003 | Kar-Kin Au et al. ......... 455/412 |
| 2003/0099256 | A1 | 5/2003 | Feinberg |
| 2003/0179774 | A1* | 9/2003 | Saidi et al. .................... 370/468 |
| 2003/0198204 | A1* | 10/2003 | Taneja et al. .................. 370/332 |
| 2003/0223429 | A1* | 12/2003 | Bi et al. ...................... 370/395.4 |
| 2004/0002341 | A1* | 1/2004 | Chen ............................. 455/453 |
| 2004/0013089 | A1* | 1/2004 | Taneja et al. .................. 370/235 |
| 2004/0160971 | A1 | 8/2004 | Krause et al. |
| 2004/0170186 | A1* | 9/2004 | Shao et al. .................... 370/412 |
| 2004/0177087 | A1 | 9/2004 | Wu et al. |
| 2005/0025090 | A1* | 2/2005 | Klein et al. ................... 370/328 |
| 2005/0207441 | A1 | 9/2005 | Onggosanusi et al. |
| 2006/0146721 | A1 | 7/2006 | Attar et al. |

FOREIGN PATENT DOCUMENTS

| | | |
|---|---|---|
| JP | 2003229894 | 8/2003 |
| JP | 2003258807 A | 9/2003 |
| JP | 2007536827 T | 12/2007 |
| TW | 546957 | 8/2003 |
| TW | 560135 | 11/2003 |
| WO | WO2004017650 | 2/2004 |
| WO | 2004045087 A2 | 5/2004 |

OTHER PUBLICATIONS

International Search Report, PCT/US2005/015812, International Search Authority—European Patent Office, Sep. 16, 2005.

International Search Report, PCT/US2007/062897, International Search Authority—European Patent Office, Aug. 10, 2007.

Anelli et al., "Differentiated Services over Shared Media," IwQOS'01 International Workshop on Quality of Service, Karlsruhe, Germany, Jun. 6-8, 2001, pp. 288-293.

Wang et al., "Adaptive-weighted packet scheduling for premium service," Communications, 2001. ICC 2001. IEEE International Conference on vol. 6, Jun. 11-14, 2001, pp. 1846-1850.

3GPP2 C.S0024-A, "cdma2000 High Rate Packet Data Air Interface Specification," Version 1.0 Mar. 2004.

3GPP2 C.S0024-O, "cdma2000 High Rate Packet Data Air Interface Specification," Version 4.0, Oct. 2002.

ETSI TS 125 211 V3.5.0 (Dec. 2000), Universal Mobile Telecommunications System (UMTS); Physical Channels and Mapping of Transport Channels onto Physical Channels (FDD), (3GPP TS 25.211 version 3.5.0 Release 1999).

ETSI TS 125 212 V3.5.0 (Dec. 2000), Universal Mobile Telecommunications System (UMTS); Multiplexing and channel coding (FDD). (3GPP TS 25.212 version 3.5.0 Release 1999).

3GPP TS 125.213 V5.0.0 (Mar. 2002), 3rd Generation Partnership Project;Technical Specification Group Radio Access Network; Spreading and modulation (FDD), (3GPP TS 25.213 version 5.0.0 Release 5).

3GPP TS 125.214 V5.0.0 (Mar. 2002), 3rd Generation Partnership Project; Technical Specification Group Radio Access Network: Physical layer procedures (FDD), (3GPP TS 25.214 version 5.0.0 Release 5).

3GPP TS 125.302 V4.4.0 (Mar. 2002), 3rd Generation Partnership Project; Technical Specification Group Radio Access Network; Services Provided by the Physical Layer (UMTS), (3GPP TS 25.302 version 4.4.0 Release 4).

Written Opinion—PCT/US05/015812, International Searching Authority—European Patent Office, Sep. 16, 2005.

International Preliminary Report on Patentability—PCT/US05/015812—IPEA/US, Apr. 28, 2006.

Written Opinion—PCT/US07/062897—International Searching Authority—European Patent Office, Aug. 10, 2007.

TIA/EIA/IS-95-B Mobile Station—Base Station Compatibility Standard for Dual-Mode Wideband Spread Spectrum Cellular System (IS-95 Standard), Feb. 3, 1999.

Taiwan Search Report—TW094114631—TIPO—Nov. 28, 2011.

* cited by examiner

METHOD AND APPARATUS FOR ADAPTIVE DELAY MANAGEMENT

CLAIM OF PRIORITY UNDER 35 U.S.C. §119

The present Application for Patent claims priority to Provisional Application No. 60/568,650 entitled "ADAPTIVE DELAY MANAGEMENT" filed May 5, 2004, and assigned to the assignee hereof and hereby expressly incorporated by reference herein.

The present Application for Patent claims priority to Provisional Application No. 60/625,660 entitled "ADAPTIVE DELAY MANAGEMENT" filed Nov. 4, 2004, and assigned to the assignee hereof and hereby expressly incorporated by reference herein.

BACKGROUND

1. Field

The present invention pertains generally to communications, and more specifically to a scheduling transmissions in a wireless communication system using adaptive delay management.

2. Background

Wireless communication systems include systems processing communications using a circuit switched, or fixed resource allocation, type technology and systems processing communications using a packet switched, or dynamic resource allocation, type technology. Circuit switching and packet switching both may be used in networks capable of high capacity. In a circuit switched communications system, a dedicated communication path is established between the sender and receiver; and network resources between the transmitter and the receiver are considered static before the start of the transfer, thus creating a "circuit." The resources remain dedicated to the circuit during the entire transfer and the entire message follows the same path. In packet-switched networks, the message is broken into packets, each of which may take a different route to the destination where the packets. Upon receipt, the packets are recompiled to retrieve the original message. In a packet-switched system, packets representing messages or fragments of messages are individually routed between nodes. Packets are routed to a destination through an expedient route. In other words, not all packets traveling between the same two hosts will necessarily follow the same route, even when such packets are part of a single message.

In a packet switched system, or shared packet data system, a Voice over Internet Protocol (VoIP) service may be used to emulate circuit switched voice communications. VoIP is typically a delay-sensitive application or service, and therefore, Quality of Service (QoS) mechanisms are used to meet delay constraints on packet delivery. Other services and types of transmissions also have various delay requirements or targets to ensure QoS. Accordingly, there is a need for adaptive delay management for scheduling transmissions in a communication system.

BRIEF DESCRIPTION OF THE DRAWINGS

The features, objects, and advantages of the presently disclosed method and apparatus will become more apparent from the detailed description set forth below when taken in conjunction with the drawings in which like reference characters identify correspondingly throughout.

DETAILED DESCRIPTION OF THE INVENTION

Figure 1A:
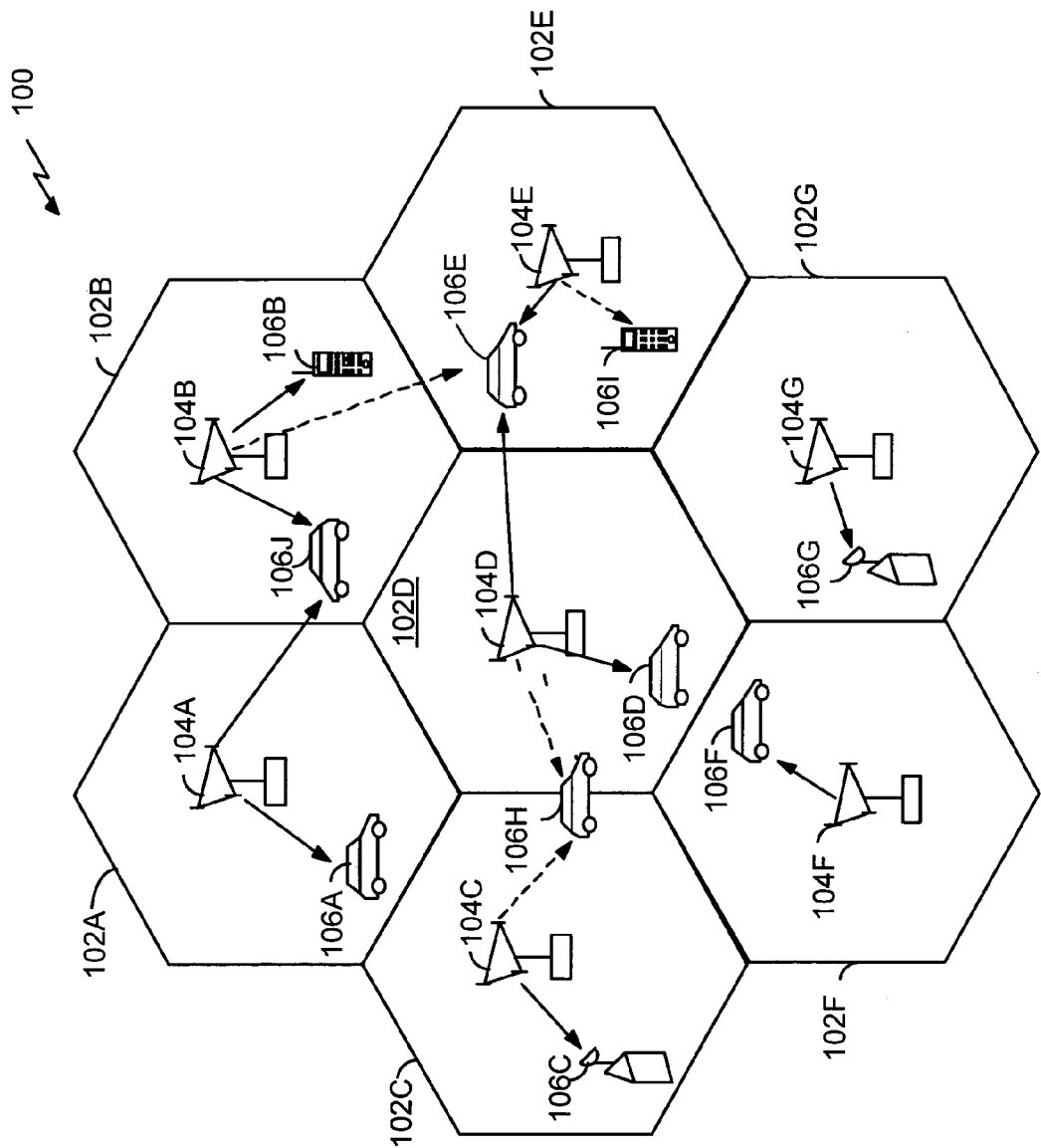
FIG. 1A is a wireless communication system.

Operation of a communication system supporting services and applications having different QoS requirements may be suboptimum and inefficient. For example, VoIP applications have delay requirements. One method emulates voice by providing equal delay constraints for multiple users independent of load and coverage. Such an approach is suboptimal as allocating resources to guarantee equal delay and avoiding optimizations possible to increase system capacity. In one embodiment, system capacity may be increased by providing non-equal delay for various users, where resources are allocated as a function of load and coverage.

The following discussion relates to a scheduling algorithm for the Forward Link (FL) of a system supporting 1xEV-DO operation, i.e., supporting IS-856 specification. In one embodiment a scheduling algorithm takes advantage of the various multi-user packets and short packets, to fulfill the Quality QoS requirements of various applications while trying to maximize the FL capacity. The scheduling algorithm also provides mechanisms to prioritize various applications. Such prioritization may be based on the type of application flow, the specific QoS requirements, or other characteristics of the flow. In one embodiment, flows are scheduled for transmission on the FL based on the delay sensitivity of the application. In one aspect, flows are differentiated based on delay sensitivity balanced with throughput sensitivity. While the following discussion considers the scheduling means and methods as implemented in the context of Revision A of the 1xEV-DO specification, the scheduling means and methods are further applicable to alternate systems, in particular, the concepts are applicable to systems wherein users are compatible with a given subset of subtypes as defined in the IS-856 specification, specifically "cdma2000 High Rate Packet Data Air Interface Specification," 3GPP2 C.S0024 Ver. 4.0, October 2002.

In the following description, terms such as "Rev-A user" or "user compatible with Rev-A" will be used to refer to an Access Terminal (AT) supporting the Medium Access Channel (MAC) Layer and Physical Layer protocol subtypes defined in IS-856, specifically "cdma2000 High Rate Packet Data Air Interface Specification," 3GPP2 C.S0024-A, Version 1.0, March 2004. In particular, a Rev-A user supports the Enhanced Forward Traffic Channel MAC Protocol. Terms such as "Rel-0 users" are used to refer to ATs supporting the MAC Layer and Physical Layer protocol subtypes defined in IS-856, but which do not support the newer subtypes defined in Revision A.

In a wireless communication system employing a Code Division-Multiple Access, CDMA, scheme, one scheduling method assigns each of the subscriber units all code channels at designated time intervals on a time multiplexed basis. A central communication node, such as a Base Station, BS, implements the unique carrier frequency or channel code associated with the subscriber to enable exclusive communication with the subscriber. TDMA schemes may also be implemented in landline systems using physical contact relay switching or packet switching. A CDMA system may be designed to support one or more standards such as: (1) the "TIA/EIA/IS-95-B Mobile Station-Base Station Compatibility Standard for Dual-Mode Wideband Spread Spectrum Cellular System" referred to herein as the IS-95 standard; (2) the standard offered by a consortium named "3rd Generation Partnership Project" referred to herein as 3GPP; and embodied in a set of documents including Document Nos. 3G TS 25.211, 3G TS 25.212, 3G TS 25.213, and 3G TS 25.214, 3G TS 25.302, referred to herein as the W-CDMA standard; (3) the standard offered by a consortium named "3rd Generation Partnership Project 2" referred to herein as 3GPP2, and TR-45.5 referred to herein as the cdma2000 standard, formerly called IS-2000 MC, or (4) some other wireless standard.

The CDMA system allows for voice and data communications between users over a terrestrial link. In a CDMA system, communications between users are conducted through one or more base stations. In wireless communication systems, forward link refers to the channel through which signals travel from a base station to a subscriber station, and reverse link refers to channel through which signals travel from a subscriber station to a base station. By transmitting data on a reverse link to a base station, a first user on one subscriber station communicates with a second user on a second subscriber station. The base station receives the data from the first subscriber station and routes the data to a base station serving the second subscriber station. Depending on the location of the subscriber stations, both may be served by a single base station or multiple base stations. In any case, the base station serving the second subscriber station sends the data on the forward link. Instead of communicating with a second subscriber station, a subscriber station may also communicate with a terrestrial Internet through a connection with a serving base station. In wireless communications such as those conforming to IS-95, forward link and reverse link signals are transmitted within disjoint frequency bands.

FIG. 1A serves as an example of a communications system 100 supporting a number of users and is capable of implementing at least some aspects and embodiments of the invention. Any of a variety of algorithms and methods may be used to schedule transmissions in system 100. System 100 provides communication for a number of cells 102A through 102G, each of which is serviced by a corresponding base station 104A through 104G, respectively. In the exemplary embodiment, some of base stations 104 have multiple receive antennas and others have only one receive antenna. Similarly, some of base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Figure 1B:
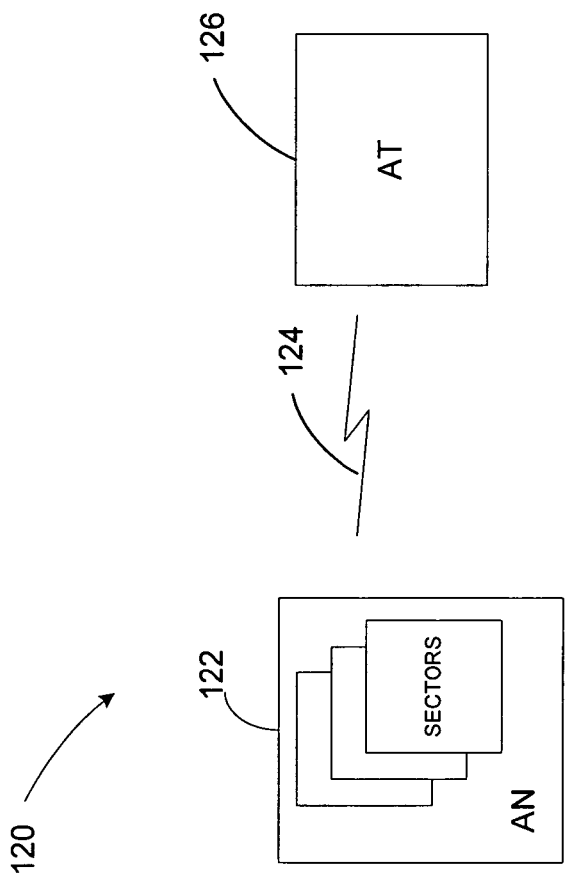
FIG. 1B is a wireless communication system supporting high data rate transmissions.

Increasing demand for wireless data transmission and the expansion of services available via wireless communication technology have led to the development of specific data services. One such service is referred to as High Data Rate (HDR). An exemplary HDR service is proposed in "EIA/TIA-IS856 cdma2000 High Rate Packet Data Air Interface Specification" referred to as "the HDR specification." HDR service is generally an overlay to a voice communication system that provides an efficient method of transmitting packets of data in a wireless communication system. As the amount of data transmitted and the number of transmissions increases, the limited bandwidth available for radio transmissions becomes a critical resource FIG. 1B illustrates an architecture reference model for a communication system 120 having an Access Network, AN, 122 communicating with an Access Terminal, AT, 126 via an air interface 124. In one embodiment, the system 10 is a Code Division-Multiple Access, CDMA, system having a High Data Rate, HDR, overlay system, such as specified the HDR standard. The AN 122 communicates with AT 126, as well as any other ATs within system 120 (not shown), by way of the air interface 124. The AN 122 includes multiple sectors, wherein each sector provides at least one Channel. A Channel is defined as the set of communication links for transmissions between the AN 122 and the ATs within a given frequency assignment. A Channel consists of a Forward Link (FL) for transmissions from the AN 122 to AT 126 and a Reverse Link (RL) for transmissions from the AT 126 to the AN 122.

For data transmissions, the AN 122 receives a data request from the AT 126. The data request specifies the data rate at which the data is to be sent, the length of the data packet transmitted, and the sector from which the data is to be sent. The AT 126 determines the data rate based on the quality of the Channel between AN 122 and AT 126. In one embodiment the quality of the Channel is determined by the Carrier-to-Interference ratio, C/I. Alternate embodiments may use other metrics corresponding to the quality of the Channel. The AT 126 provides requests for data transmissions by sending a Data Rate Control, DRC, message via a specific channel referred to as the DRC channel. The DRC message includes a data rate portion and a sector portion. The data rate portion indicates the requested data rate for the AN 122 to send the data, and the sector indicates the sector from which the AN 122 is to send the data. Both data rate and sector information are typically required to process a data transmission. The data rate portion is referred to as a DRC value, and the sector portion is referred to as a DRC cover. The DRC value is a message sent to the AN 122 via the air interface 124. In one embodiment, each DRC value corresponds to a data rate in kbits/sec having an associated packet length according to a predetermined DRC value assignment. The assignment includes a DRC value specifying a null data rate. In practice, the null data rate indicates to the AN 122 that the AT 126 is not able to receive data. In one situation, for example, the quality of the Channel is insufficient for the AT 126 to receive data accurately.

In operation, the AT 126 continuously monitors the quality of the Channel to calculate a data rate at which the AT 126 is able to receive a next data packet transmission. The AT 126 then generates a corresponding DRC value; the DRC value is transmitted to the AN 122 to request a data transmission. Note that typically data transmissions are partitioned into packets. The time required to transmit a packet of data is a function of the data rate applied.

This DRC signal also provides the information, which the channel scheduler uses to determine the instantaneous rate for consuming information (or receiving transmitted data) for each of the remote stations associated with each queue. According to an embodiment, a DRC signal transmitted from any remote station indicates that the remote station is capable of receiving data at any one of multiple effective data rates.

Figure 2:
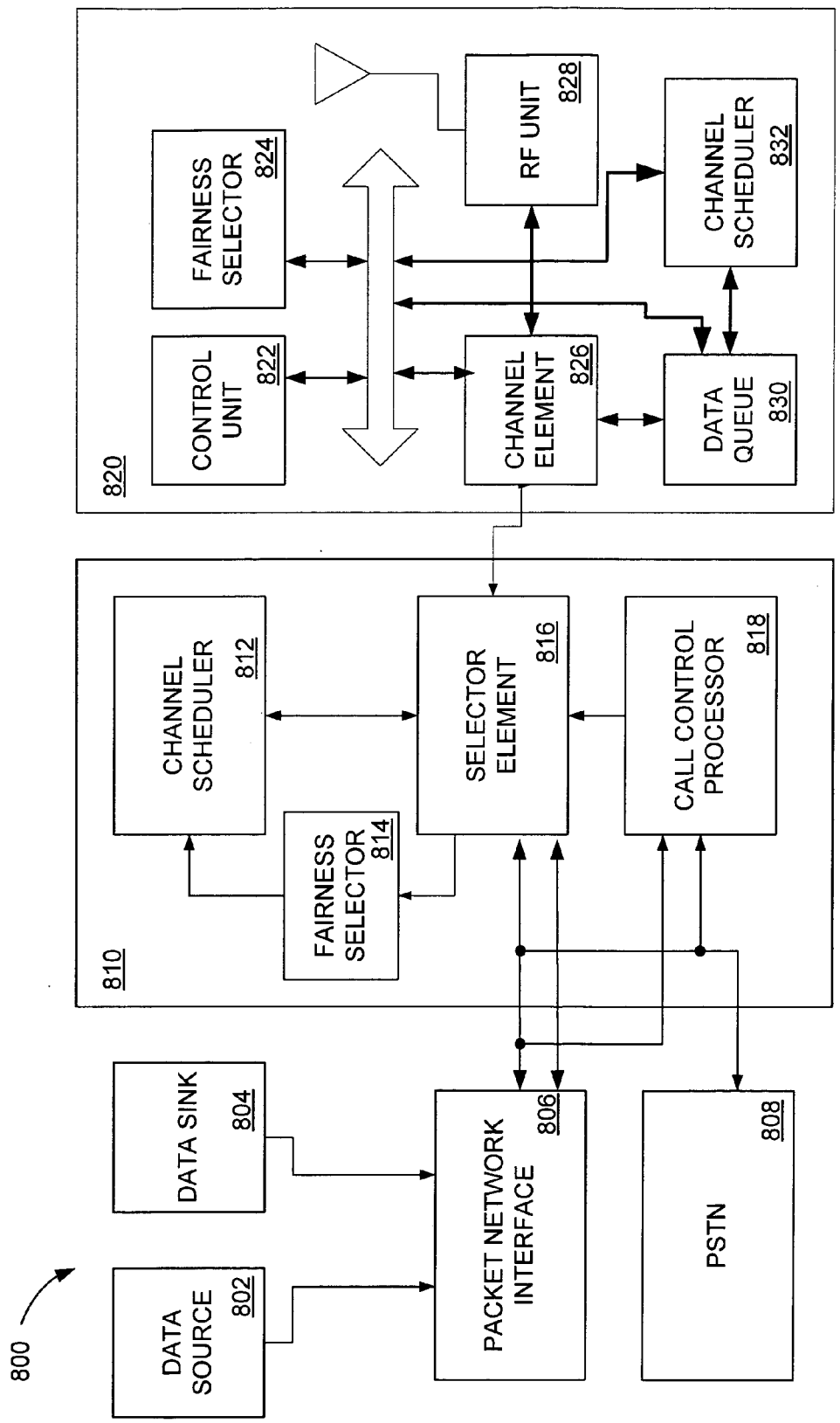
FIG. 2 is a block diagram of an Access Network (AN) in a wireless communication system.

One example of a communication system supporting HDR transmissions and adapted for scheduling transmissions to multiple users is illustrated in FIG. 2. FIG. 2 is detailed hereinbelow, wherein specifically, a base station 820 and base station controller 810 interface with a packet network interface 806. Base station controller 810 includes a channel scheduler 812 for implementing a scheduling algorithm for transmissions in system 800. The channel scheduler 812 determines the length of a service interval during which data is to be transmitted to any particular remote station based upon the remote station's associated instantaneous rate for receiving data (as indicated in the most recently received DRC signal). The service interval may not be contiguous in time but may occur once every n slots. According to one embodiment, the first portion of a packet is transmitted during a first slot at a first time and the second portion is transmitted 4 slots later at a subsequent time. Also, any subsequent portions of the packet are transmitted in multiple slots having a similar 4 slots spread, i.e., 4 slots apart from each other. According to an embodiment, the instantaneous rate of receiving data Ri determines the service interval length Li associated with a particular data queue.

In addition, the channel scheduler 812 selects the particular data queue for transmission. The associated quantity of data to be transmitted is then retrieved from a data queue 830 and provided to the channel element 826 for transmission to the remote station associated with the data queue 830. As discussed below, the channel scheduler 812 selects the queue for providing the data, which is transmitted in a following service interval using information including the weight associated with each of the queues. The weight associated with the transmitted queue is then updated.

Figure 3:
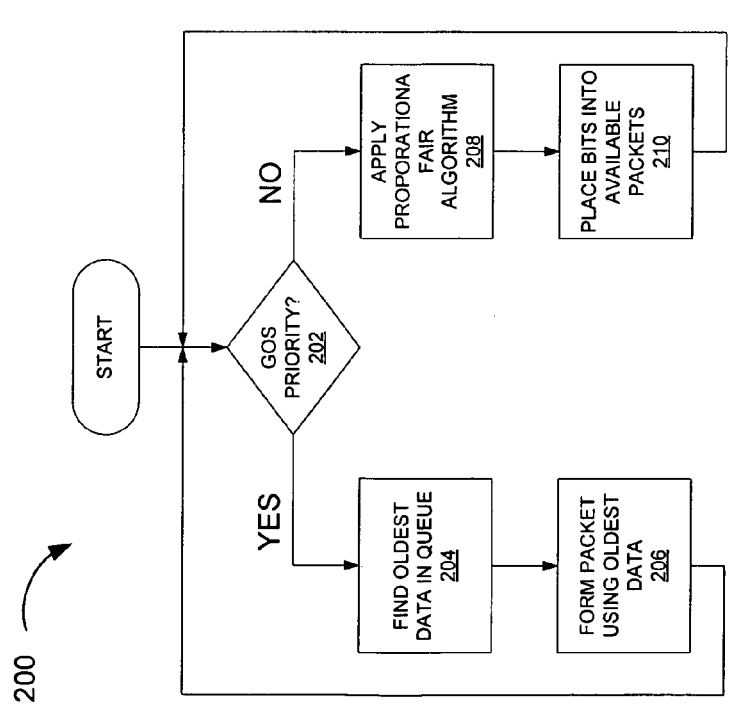
FIG. 3 is a flow diagram of a scheduling algorithm for transmissions in a wireless communication system.

Base station controller 810 interfaces with packet network interface 806, Public Switched Telephone Network, Public Switched Telephone Network (PSTN), 808, and base stations in the communication system (only one base station 820 is shown in FIG. 3 for simplicity). Base station controller 810 coordinates the communication between remote stations in the communication system and other users connected to packet network interface 806 and PSTN 808. PSTN 808 interfaces with users through a standard telephone network (not shown in FIG. 3).

Base station controller 810 contains many selector elements 816, although only one is shown in FIG. 2 for simplicity. Each selector element 816 is assigned to control communication between one or more base stations 820 and one remote station (not shown). If selector element 816 has not been assigned to a given remote station, call control processor 818 is informed of the need to page the remote station. Call control processor 818 then directs base station 820 to page the remote station.

Data source 802 contains a quantity of data, which is to be transmitted to a given remote station. Data source 802 provides the data to packet network interface 806. Packet network interface 806 receives the data and routes the data to the selector element 816. Selector element 816 then transmits the data to each base station 820 in communication with the target remote station. In the exemplary embodiment, each base station 820 maintains a data queue 830, which stores the data to be transmitted to the remote station.

The data is transmitted in data packets from data queue 830 to channel element 826. In the exemplary embodiment, on the forward link, a "data packet" refers to a quantity of data which is a maximum of 1024 bits and a quantity of data to be transmitted to a destination remote station within a predetermined "time slot" (such as ≈1.667 msec). For each data packet, channel element 826 inserts the necessary control fields. In the exemplary embodiment, channel element 826 performs a Cyclic Redundancy Check, CRC, encoding of the data packet and control fields and inserts a set of code tail bits. The data packet, control fields, CRC parity bits, and code tail bits comprise a formatted packet. In the exemplary embodiment, channel element 826 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 828 which quadrature modulates, filters, and amplifies the signal. The forward link signal is transmitted over the air through an antenna to the forward link.

At the remote station, the forward link signal is received by an antenna and routed to a receiver. The receiver filters, amplifies, quadrature demodulates, and quantizes the signal. The digitized signal is provided to a demodulator (DEMOD) where it is despread with the short PNI and PNQ codes and decovered with the Walsh cover. The demodulated data is provided to a decoder which performs the inverse of the signal processing functions done at base station 820, specifically the de-interleaving, decoding, and CRC check functions. The decoded data is provided to a data sink.

The hardware, as pointed out above, supports variable rate transmissions of data, messaging, voice, video, and other communications over the forward link. The rate of data transmitted from the data queue 830 varies to accommodate changes in signal strength and the noise environment at the remote station. Each of the remote stations preferably transmits a Data Rate Control, DRC, signal to an associated base station 820 at each time slot. The DRC signal provides information to the base station 820, which includes the identity of the remote station and the rate at which the remote station is to receive data from its associated data queue. Accordingly, circuitry at the remote station measures the signal strength and estimates the noise environment at the remote station to determine the rate information to be transmitted in the DRC signal.

The DRC signal transmitted by each remote station travels through a reverse link channel and is received at base station 820 through a receive antenna coupled to RF unit 828. In the exemplary embodiment, the DRC information is demodulated in channel element 826 and provided to a channel scheduler 812 located in the base station controller 810 or to a channel scheduler 832 located in the base station 820. In a first exemplary embodiment, the channel scheduler 832 is located in the base station 820. In an alternate embodiment, the channel scheduler 812 is located in the base station controller 810, and connects to selector elements 816 within the base station controller 810.

Transmission scheduling in a circuit-switched system may involve a proportional fair algorithm, wherein a priority function is defined for each user. An example of a proportional fair algorithm is presented hereinbelow. The priority function may take into consideration the requested data rate for a given user, typically a function of forward link channel quality to the user, and the throughput for the user. Capacity is thus balanced by first serving those users having high requested data rates compared to throughput.

Transmission scheduling in a packet-switched system, according to one embodiment, balances capacity with user delay. Application flows are transmitted as datagrams, which are independent, self-contained messages sent over a network. The datagram arrival, arrival time, and content are not generally guaranteed. Datagrams associated with a same application flow may be transmitted by different routes to a same user. The datagrams are reassembled at the receiver. The end-to-end delay in a packet-switched system is not fixed, and therefore, the scheduler may use this difference in delay and adjust the delay for the various users to increase capacity. For example, the scheduler may decrease the delay experienced by users requesting data having low delay bounds and/or delay variation limits. Such applications include but are not limited to VoIP, video, etc. Transmissions may have specific Grade of Service (GoS) or QoS requirement(s). A VoIP type communication, for example, requires the packets arrive having a defined latency, or within an allowable delay period. Therefore, it may be desirable to prioritize those communications or applications having a lower latency requirement or other GoS specification(s). Multimedia conferencing, video streaming, web browsing, File Transfer Protocol transfers, each have specific GoS requirements.

To implement a priority classification scheme, each flow is assigned a priority function. In one embodiment, a Priority Function (PF) for a packet-switched scheduler may then be given as:

$$PF = f(\text{delay})$$

wherein f( ) is a function, and the PF is then determined based on the delay requirement of a given user or a given application for a user. The PF is calculated for each datagram in each queue; the various PF are compared to identify the higher priority flow instances. Packet-switched communications allow scheduling to incorporate adaptive delay management, as the end-to-end delay of a given communication is not fixed. This is in contrast to a circuit-switched communication where the end-to-end delay is fixed.

Note that the following discussion considers a cdma2000 system supporting High Rate Packet Data (HRPD) services as described in IS-856. This system is used as an example. The present invention is applicable to other systems wherein users are selected for service according to a scheduling algorithm In an HRPD system, the air interface may support up to four parallel application streams. The first stream carries signaling information, and the other three may be used to carry applications with different QoS requirements or other applications.

The following glossary is provided for clarity in understanding one embodiment presented hereinbelow. The following glossary is not intended to be exhaustive. The following glossary is not intended to limit the present invention thereto, but rather is provided for clarity and understanding with respect to one embodiment of a communication system supporting an adaptive weighted scheduling algorithm.

GLOSSARY

Access Network (AN)—the network equipment providing data connectivity between a cellular network and a packet switched data network (typically the Internet) and the ATs. An AN in an HRPD system is equivalent to a base station in a cellular communication system.

Access Terminal (AT)—a device providing data connectivity to a user. An AT in an HRPD system corresponds to a mobile station in a cellular communication system. An AT may be connected to a computing device such as a laptop personal computer or it may be a self-contained data device such as a Personal Digital Assistant (PDA).

Application flow—the designated transmission path from source to AT for a given application stream. Each application flow is identified by a source, destination, traffic profile and quality of service profile.

Application stream—a data communication corresponding to an application. Most applications streams have designated quality of service requirements.

Automatic repeat request (ARQ)—a mechanism whereby the transmitter initiates a retransmission of data based on occurrence or non-occurrence of an event.

Average data rate—average input data rate over time for a given application flow.

Burstiness ($\sigma$)—measure of the burstiness or density and relation in time of packets in an application flow.

Best Effort (BE)—Application flows that in general have a relatively large volume of data to receive over the air, but the nature of the traffic is such that relatively large delays may be tolerated, but the data loss rate should be extremely small.

Data Rate Control (DRC)—a mechanism whereby an AT transmits a requested data rate to the AN.

Deficit Bits (defbits)—number of bits corresponding to the deficit packets.

DelayBound—specified time (delay bound) allowed for transmission of a packet of data from AN to AT.

Expedited Forwarding (EF)—application flows typically have small amounts of traffic that arrive from the Internet to the Access Network, however the nature of the traffic is such that the data packets should be delivered to the user within a certain relatively small DelayBound, with reasonable data loss rate.

Forward Link (FL)—transmission air link from AN to AT.

Head Of Line (HOL) packet—first packet in a queue.

High Rate Packet Data (HRPD)—a data service transmitting packet data communications at a high data rate. Also referred to as High Data Rate (HDR), and specified in the IS-856 standard entitled "cdma2000 High Rate Packet Data Air Interface Specification."

Jitter—time variation between received successive packets.

Jitter bound—bound on the jitter for a given application flow.

Motion Pictures Experts Group (MPEG)—protocol for transmission of multimedia materials.

Proportional Fair (PF) algorithm—a scheduling algorithm wherein data communications are scheduled according to a selection factor calculated for each AT as a ratio of a requested data rate to throughput.

Quality of Service (QoS)—requirements relating to transmission of a packet data communication, including but not limited to, delay, required rate, and jitter.

Reverse Link (RL)—transmission air link from AT to AN.

Transmission queue—Transmission queue storing application flows for a given BTS.

Many wireless communications take advantage of the Internet Protocol (IP) to take advantage of different Per Hop Behavior (PHB) and different routings for processing packet data. Generally, the Internet is made up of a multitude of networks built from various link layer technologies which rely on IP to interoperate. IP offers a connectionless network layer service which is subject to packet loss and delay which increase with the network load. The basic IP delivery model is referred to as Best-Effort (BE). However, some applications may require a better service than the simple BE service. For example, multimedia applications may specify a fixed bandwidth, a low delay and little jitter. Another priority type is a forwarding behaviors referred to as Assured Forwarding (AF) which guarantees a throughput level.

There are various aspects in QoS management. Some considerations of QoS management are bandwidth allocation, and guaranteed bandwidth over shared media also known as broadcast networks, e.g. an Ethernet network or a wireless Local Area Network (LAN). While there is growing demand to include wireless capabilities in laptop computers and other computing devices. However, wireless networks are bandwidth limited and thus capacity conservation and optimization becomes a critical consideration.

FIG. 3 illustrates a scheduling method which prioritizes transmissions based on Grade of Service (GoS) or QoS requirements. At the AN, data for transmission is stored in a memory storage unit adapted to store the data queues corresponding to incoming application flows. A queue is stored for each instance of an application flow. According to the present invention, an application flow is divided into instances, wherein each instance is an octet of data. Therefore, an application flow may have, and often will have, multiple queues associated therewith. Each queue then has an associated QoS and/or GoS priority type defined transmission and reception requirements. For example, the priority type may be based on an end-to-end delay requirement or on some other quality criteria. Note, a given transmission may fall into one of multiple GoS priority types. For example, some services allow packets of data to be transmitted individually and then reunited at the receiver at a later time without loss of continuity, i.e., BE priority type. In contrast, applications designed to give the user a real-time experience, such as VoIP, have a higher priority type and are referred to as Expedited Forwarding (EF) priority type. The EF priority type includes applications having limits on delay bound and delay variation. In the present example, the scheduler prioritizes EF communications. The QoS or GoS priority type may also be referred to as a QoS class. In addition, each queue has a sensitivity associated therewith. For example, an EF application flow is typically delay sensitive, meaning transmission of the EF application flow has delay requirements which are to be met. In many cases, if the delay requirements are not met the data is discarded and not transmitted. In contrast, a BE application flow is typically throughput sensitive, meaning transmission of the BE application flow has target throughput requirements, but does not necessarily have the strict delay requirements of an EF application flow.

FIG. 3 illustrates a scheduling method 200 implementing adaptive delay management according to one embodiment. Within the AN, a scheduler implements a scheduling algorithm, providing high rate packet data transmissions to multiple users. The scheduler checks the data queue to determine the GoS type for data. If any of the data is of a given GoS priority type, i.e., priority type defining more specific requirements than BE, at decision diamond 202, the process continues to step 204 to find an oldest data of a highest priority type in the queue. As used herein a higher priority type refers to a GoS priority type defined by a stricter specification. For example, one priority type may specify a delay bound, while another may specify a jitter bound. In this case the priority type specifying the delay bound is considered a higher priority and is thus considered first.

According to the present embodiment, the scheduler first orders the bits into packets for transmission based on delay requirements. Once high priority data is scheduled, another algorithm may be applied to schedule remaining packets.

For example, when EF data is in the queue, the scheduler begins forming packets for transmission using the EF data. The EF data is selected based on the age of the data in the queue, step 204. In one embodiment, as data is put into the queue, at which time the data receives a time stamp. The scheduler finds the EF data having the earliest time stamp and puts this into a packet first. The scheduler then continues putting EF data into packets according to age in the queue, step 206. Once all of the EF data has been placed into packets for transmission, the scheduler then applies another algorithm for the rest of the data. In the present embodiment, the scheduler applies a proportional fair algorithm to the rest of the data, which may be Best Effort (BE) data, step 208. The BE data is then put into packets according to the proportional fair algorithm, step 210.

Note, as the channel condition increases users request data at higher rates, which has the effect of lowering the delay bound. Therefore, even when the scheduler prioritizes EF data, delay bound may be a function of the channel condition.

For transmission of BE data, the scheduler selects the packet to maximize throughput. Throughput is generally calculated as:

$$Throughput = (bits\ per\ packet)/(slots\ per\ packet).$$

According to one embodiment, the PF may be given as:

$$PF = f(packet\ age) * g(channel\ condition) * h(cell\ loading),$$

which considers the packet age as well as the channel condition and loading of the cell in scheduling transmissions. Such a calculation may be used for scheduling EF data or BE data.

Referring again to FIG. 2, in one embodiment, channel scheduler 832 receives information from data queue 830 indicating the amount of data queued up for each remote station, also called queue size. Channel scheduler 832 then performs scheduling based on DRC information and queue size for each remote station serviced by base station 820. If queue size is required for a scheduling algorithm used in the alternate embodiment, channel scheduler 812 may receive queue size information from selector element 816.

During the transmission of a packet to one or more users, the users transmit an ACKnowledge "ACK" signal after each time slot containing a portion of the transmitted packet. The ACK signal transmitted by each user travels through a reverse link channel and is received at base station 820 through a receive antenna coupled to RF unit 828. In the exemplary embodiment, the ACK information is demodulated in channel element 826 and provided to a channel scheduler 812 located in the base station controller 810 or to a channel scheduler 832 located in the base station 820. In a first exemplary embodiment, the channel scheduler 832 is located in the base station 820. In an alternate embodiment, the channel scheduler 812 is located in the base station controller 810, and connects to selector elements 816 within the base station controller 810.

Embodiments of the present invention are applicable to other hardware architectures, which may support variable rate transmissions. The present invention may be readily extended to cover variable rate transmissions on the reverse link. For example, instead of determining the rate of receiving data at the base station 820 based upon a DRC signal from remote stations, the base station 820 measures the strength of the signal received from the remote stations and estimates the noise environment to determine a rate of receiving data from the remote station. The base station 820 then transmits to each associated remote station the rate at which data is to be transmitted in the reverse link from the remote station. The base station 820 may then schedule transmissions on the reverse link based upon the different data rates on the reverse link in a manner similar to that described herein for the forward link.

Also, a base station 820 of the embodiment discussed above transmits to a selected one, or selected ones, of the remote stations to the exclusion of the remaining remote stations associated with the base station 820 using a Code Division-Multiple Access, CDMA, scheme. At any particular time, the base station 820 transmits to the selected one, or selected ones, of the remote station by using a code, which is assigned, to the receiving base station(s) 820. However, the present invention is also applicable to other systems employing different Time Division-Multiple Access, TDMA, methods for providing data to select base station(s) 820, to the exclusion of the other base stations 820, for allocating transmission resources optimally.

The channel scheduler 812 schedules the variable rate transmissions on the forward link. The channel scheduler 812 receives the queue size, which is indicative of the amount of data to transmit to a remote station, and messages from remote stations. The channel scheduler 812 preferably schedules data transmissions to achieve the system goal of maximum data throughput while conforming to a fairness constraint.

As shown in FIG. 1A, remote stations are dispersed throughout the communication system and may be in communication with zero or one base station on the forward link. In the exemplary embodiment, channel scheduler 812 coordinates the forward link data transmissions over the entire communication system.

According to an embodiment, the channel scheduler 812 of FIG. 2 is implemented in a computer system, which includes a processor, Random Access Memory, RAM, and a program memory for storing instructions to be executed by the processor (not shown). The processor, RAM and program memory may be dedicated to the functions of the channel scheduler 812. In other embodiments, the processor, RAM and program memory may be part of a shared computing resource for performing additional functions at the base station controller 810. In the exemplary embodiment a generalized scheduler is applied to the system 800 illustrated in FIG. 2 and is detailed hereinbelow. Those modules within the BSC 810 and BS 820 used to implement a priority function for scheduling data transmissions is discussed after establishing the specifics of the generalized scheduler.

Given the growing demand for wireless data applications, the demand for very efficient wireless data communication systems has increased significantly. The IS-95 standard is capable of transmitting traffic data and voice data over the forward and reverse links. In accordance with the IS-95 standard, the traffic data or voice data is partitioned into code channel frames that are 20 milliseconds wide with data rates as high as 14.4 Kbps. In an IS-95 system, each subscriber station is allocated at least one of a limited number of orthogonal forward link channels. While the communication between a base station and a subscriber station is ongoing, the forward link channel remains allocated to the subscriber station. When data services are provided in an IS-95 system, a forward link channel remains allocated to a subscriber station even during times when there is no forward link data to be sent to the subscriber station.

A significant difference between voice services and data services is the fact that the former imposes stringent and fixed delay requirements. Typically, the overall one-way delay for speech frames is specified to be less than 100 milliseconds. In contrast, the data delay may become a variable parameter used to optimize the efficiency of the data communication system.

Another significant difference between voice services and data services is that the former requires a fixed and common grade of service (GoS) for all users. Typically, for digital systems providing voice services, this translates into a fixed and equal transmission rate for all users and a maximum tolerable value for the error rates of the speech frames. In contrast, for data services, the GOS may be different from user to user and may be a parameter optimized to increase the overall efficiency of the data communication system. The GOS of a data communication system is typically defined as the total delay incurred in the transfer of a predetermined amount of data, hereinafter referred to as a data packet.

Yet another significant difference between voice services and data services is that the former requires a reliable communication link which, in the exemplary CDMA communication system, is provided by soft handoff. Soft handoff results in redundant transmissions from two or more base stations to improve reliability. However, this additional reliability is not required for data transmission because the data packets received in error may be retransmitted. For data services, the transmit power used to support soft handoff may be more efficiently used for transmitting additional data.

Transmission delay required to transfer a data packet and the average throughput rate are two attributes used to define the quality and effectiveness of a data communication system. Transmission delay does not have the same impact in data communication as it does for voice communication, but it is an metric for measuring the quality of the data communication system. The average throughput rate is a measure of the efficiency of the data transmission capability of the communication system. There is a need in the art for communication systems that provide improved data throughput while simultaneously providing a GOS that is appropriate for the types of service being provided over a wireless channel The need for a generalized scheduler is based on the requirements and targets of data transmission in a wireless system. For data transmissions, throughput is defined in terms of the delays incurred in the transmission of packets of data rather than in terms of individual bits or bytes. A data packet, such as an Internet Protocol, IP, datagram, is an indivisible unit as, in most cases, receipt of only a portion of a packet does not contain sufficient information for the user to decode and use the entire packet, i.e., the packet is useless to the end user. The end user receives the packet of data, performs a Cyclic Redundancy Check, CRC, on the packet of data, and processes the data. Therefore, the user is most concerned with the arrival time of the last bit of a packet and is not as concerned with the delay of individual bits in the data packet. This allows considerable flexibility in rate allocations to different users over time scales smaller than the transmission time of a data packet. Furthermore, in a Transmission Control Protocol, TCP, type connection, some variation of packets delays is acceptable as long as the variation is not so unpredictable that it causes TCP retransmissions needlessly.

Another feature of the wireless channel is the variability of the channel itself. In an HDR type system, this variability results in variations of the requested rate over a period of time. To maximize use of the channel, the scheduler is designed to serve high rate users, i.e., users requesting the highest data rates. This means that occasionally, the users may not be served for periods of time when their requested rates are lower. The overall throughput will be maximized when the scheduler does not serve low rate users for long periods of time. However, ideally the scheduler balances this against the desire for packet delays and delay variations to be relatively consistent as explained hereinabove.

Another aspect considers the fairness to the multiple users in a system. To accomplish a fair scheduling method, the scheduler ideally distributes the overall throughput among different users. Different bases of fairness (or allowable unfairness) are used by different systems to affect the needs and desires of the individual systems. The concept of fairness is a key concept in many scheduling algorithms. Fairness provides different amounts of flexibility in serving different users and hence has an impact on the overall throughput of a sector.

According to one embodiment, a method and apparatus for scheduling transmissions in a communication system with application to multiple classes of users incorporates a generalized scheduler. The generalized scheduler accommodates a variety of different scheduling priorities. Different classes of users each having specific transmission requirements are serviced by a generalized scheduler, which maintains a high throughput over all users.

In one embodiment, operation of a generalized scheduler implements a priority function of a channel condition metric and a fairness criteria, wherein the priority function is defined as:

$$f(A_i(t), U_i(t)),$$

wherein $A_i(t)$ is referred to as the channel condition metric and $U_i(t)$ is referred to as the user fairness metric. The function $A_i(t)$ specifies the desirability of serving user i at time t based on a current channel condition. The function $U_i(t)$ specifies the desirability of serving user i at time t based on the past history of received service. The priority function $f(\ )$ combines the two desirability metrics, $A_i(t)$ and $U_i(t)$, to determine a priority level for each user.

According to one embodiment, a generalized scheduler serves the user with the highest priority function $f(A_i(t), U_i(t))$ within a given class or type of users. In the exemplary embodiment, the value taken by the priority function $f(A_i(t), U_i(t))$ increases as the channel condition function $A_i(t)$ increases and decreases as the fairness function $U_i(t)$ increases. The functions $A_i(t)$ and $U_i(t)$ are determined accordingly.

Further, the priority function $f(\ )$ is a function of at least one time period over which the channel condition metric and the user fairness metric are measured. In an alternate embodiment, the priority function $f(\ )$ may be a time-dependent per user function. However, for simplicity, a scheduler may use a combiner function common to all users and modify the user fairness metric to reflect the user requirements.

A generic class of multi-user schedulers, categorizes users receiving service from an AN into at least two broad categories, BE and EF. Other categories of transmissions may be implemented as well, such as AF, etc. BE and EF are as defined herein. Specifically, Best Effort (BE) applications in general have a relatively large volume of data to receive over the air, but the nature of the traffic is such that relatively large delays may be tolerated, but the data loss rate should be extremely small;

Expedited Forwarding (EF) application flows typically have small amounts of traffic that arrive from the Internet to the Access Network, however the nature of the traffic is such that the data packets should be delivered to the user within a certain relatively small DelayBound, with reasonable data loss rate.

In a packet data system such as 1xEV-DO, the scheduler has the flexibility to allow variable delay performance to individual users to maximize the capacity. Here, capacity refers to the throughput for BE users and to the number of served users with acceptable performance in the case of delay sensitive traffic such as VoIP (EF users).

In 1xEV-DO generally, increasing the DelayBound of a user improves utilization of the FL thus increasing the BE and EF capacity of the system. This capacity increase follows from various factors including, but not limited to, higher packing efficiency and the ability to take advantage of local channel conditions and multi-user diversity gain.

In the case of BE-only traffic, a typical scheduler is the Proportional Fair (PF) scheduler. This scheduler is proportionally fair in the sense that the throughput provided to individual users would be approximately proportional to the user's geometry, i.e., average channel condition. The proportional fair scheduler has been the scheduler of choice for BE-only traffic because of the benefits of throughput to fairness tradeoffs. In addition, the PF algorithm is designed to take advantage of local channel peaks while providing multi-user diversity gain. As used herein, such a PF scheduler will be referred to as the "proportionally fair throughput scheduler."

Note, in the case of BE-only traffic, there is another class of schedulers: The "equal grade of service" scheduler. This scheduler aims at providing equal throughput to all users. For this reason, the system capacity is determined by the weakest users. Although equal grade of service scheduler could be desirable in certain applications, such schedulers do not typically utilize the air link efficiently. These schedulers are referred to herein as "equal throughput schedulers."

The PF throughput schedulers and the equal throughput schedulers described above are useful in the context of BE-only traffic. For delay sensitive EF traffic, these schedulers may not be sufficient as missing a mechanism for delay control.

The following presents delay-sensitive scheduling means and methods which operate in parallel with the two approaches for BE-only traffic, i.e., PF throughput and equal throughput schedulers. In the case of delay sensitive traffic, the "proportional" versus "equal" fairness applies not only to the throughput provided to individual users, but to the "delay" performance provided to individual users. The delay performance may be quantified in terms of average delay or delay tail weight, etc. Note, alternate embodiments may incorporate the BE and EF scheduling into a common method, while meeting the throughput and delay sensitivity requirements, respectively.

In one embodiment, an approximately equal delay performance may be provided to each user. This approach is similar to equal throughput and for the symmetry of terminology, is referred to as the "equal delay scheduler." An equal throughput scheduler attempts to provide equal throughput to all users, therefore, the system capacity may be determined by the users having the weakest coverage. An equal delay scheduler attempts to provide equal delay performance, such as equal mean delay, or equal delay tail weight, to all users and therefore, system capacity is similarly determined by the users having the weakest coverage.

In another embodiment, the delay performance provided to a user is proportional to the average geometry of the user. This approach is similar to the proportionally fair throughput scheduler and is referred to as the "proportionally fair delay scheduler." The proportional fair throughput scheduler tries to provide throughput to individual users proportional to their average geometry, thus significantly improving the system capacity compared to an equal throughput scheduler. Similarly, a proportionally fair delay scheduler would provide a delay performance to each individual user proportional to the user's average geometry, thus maximizing the EF capacity.

Figure 4:
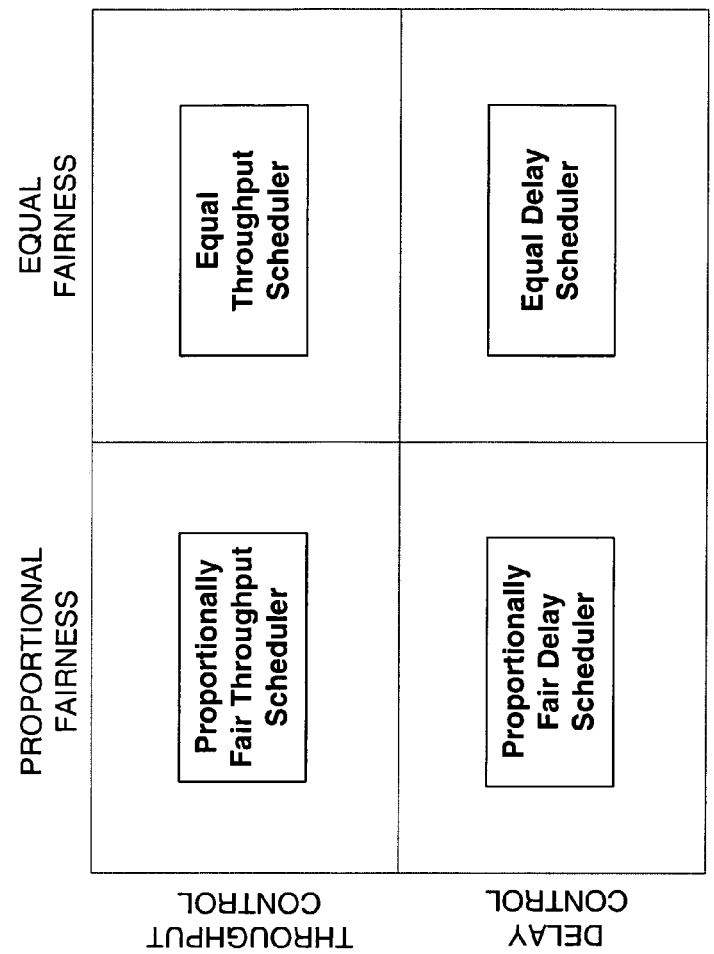
FIG. 4 illustrates categorization of packet data schedulers.

The four categories of packet scheduling are illustrated in FIG. 4. Each category is illustrated with the balance of QoS considerations. Specifically, the PF throughput scheduler balances throughput control with proportional fairness. The equal throughput scheduler balances throughput control with equal fairness. The PF delay scheduler balances delay control with proportional fairness. The equal delay scheduler balances delay control with equal fairness.

While some scheduling methods are useful in circuit switched systems, others are more applicable for packet data systems, such as 1xEV-DO. The proportionally fair delay scheduling means and methods presented herein may provide an advantage of packet switched systems over circuit switched systems.

In addition to improving system capacity, the PF delay scheduler may also enhance the user experience. For example, users in close proximity to BSs are more likely to receive better delay performance than users far from BSs. This is in contrast to delay performance which is not dependent on the user's proximity to the AN. In addition, for users at high geometry, in close proximity to a BS, the performance may be predictable with a high confidence level; whereas for an equal delay scheduler, the performance may be unpredictable depending on the current load on the system. It is therefore, desirable for a scheduler to provide quality of service increases with increases in the geometry of the individual users.

A scheduler that serves both BE and EF users may utilize an appropriate combination of proportionally fair throughput and delay scheduling. Such a scheduler will be referred to as a "proportionally fair throughput/delay scheduler." Note, in one embodiment, proportionally fair throughput/delay scheduling is implicitly based on relative geometries of users served for a single sector. This is referred to as "intra-sector fairness." Another issue to consider in design of a scheduler is the "inter-cell" fairness, which may be described as the average level of service, which may be quantified in terms of throughput provided to BE users and the average delay provided to EF users, etc., provided by different sectors to the users served by those sectors.

To continue the analogy between proportionally fair throughput scheduler and the proportionally fair delay scheduler, note that the throughput provided to individual BE users by a sector that utilizes proportionally fair throughput scheduler decreases as the number of users served by that sector increases. However, the intra-sector fairness is maintained. Similarly, the delay performance provided to individual EF users provided by a sector that utilizes proportionally fair delay scheduler may be allowed to increase as the number of users served by the sector increases.

The proportionally fair throughput/delay scheduler utilizes a decision metric of the following form to select which users to serve at any scheduling decision:

$$\text{DecisionMetric} = f(\text{PacketAge}, \text{ChannelCondition}, \text{SectorLoad})$$

wherein PacketAge refers to the difference between the current time and an appropriate timestamp defined for each packet waiting in the base station queue, the channel condition refers to the quality of the radio link between the BS and the AT, and the SectorLoad refers to the volume and profile of the total traffic being served by the sector over a short span of time around the current time. The function f( ) depends on the particular implementation of the scheduler. Also, the DecisionMetric may refer to a bit metric, a packet metric, a datagram metric, or any other means to provide the scheduler with a method of transmission instance selection.

The ChannelCondition information may be incorporated into the scheduler in various ways. For example, the proportionally fair throughput scheduler uses the Data Rate Control (DRC)/AvgThroughput which tends to peak during local channel peaks. Another approach could be to use DRC/AvgDRC, but in application may favor users with larger channel fluctuations. Another possibility could be to use a feedback loop to indicate a certain percentile of channel peaks. One such loop 300 is illustrated in FIG. 5.

Figure 5:
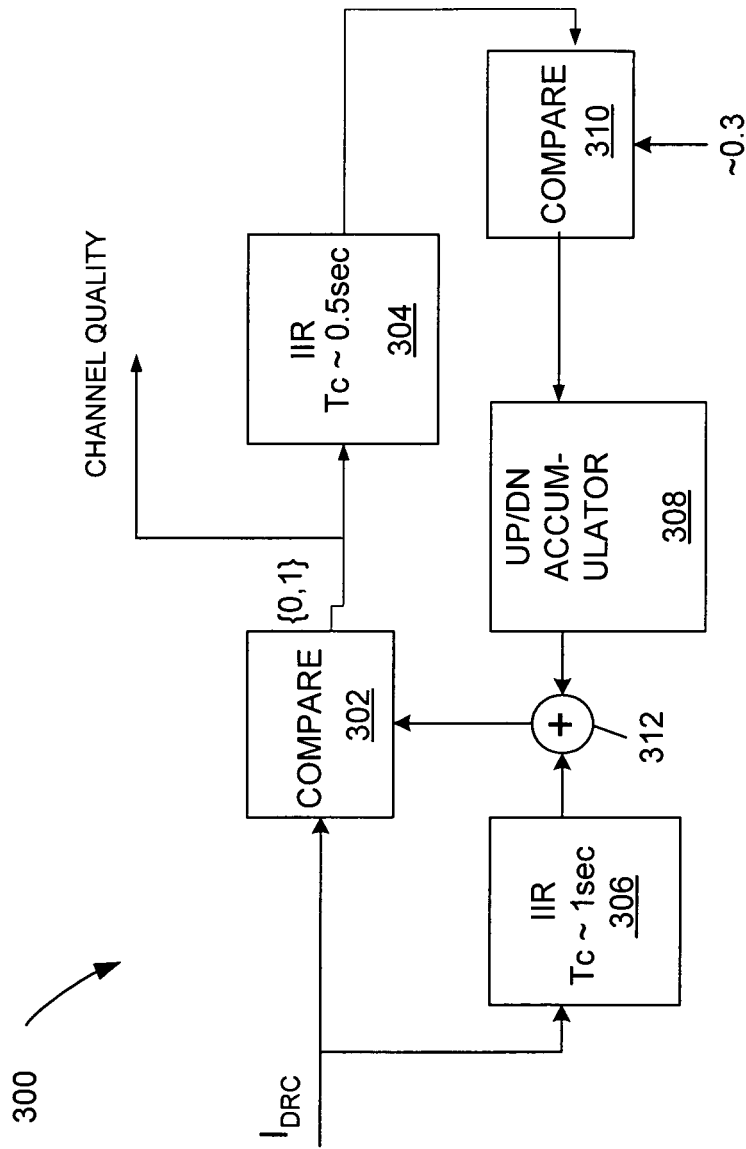
FIG. 5 illustrates a feedback loop for determining channel strength measures based on received data requests from a user.

One embodiment, as illustrated in FIG. 5, is a loop 300 designed to determine acceptable channel quality with respect to a threshold. The input, IDRC, is a function or index of the DRC value, e.g., an increasing function of the data rate associated with the DRC, wherein IDRC increases as the requested data rate increases. The IDRC is provided to compare unit 302 and to an Infinite Impulse Response filter (IIR) 306. In one example the time constant is set to 1 s, however, alternate time constants may be implemented. The filtered output of IIR filter 306 is provided to a summing unit 312, which provides the threshold value to compare unit 302. The compare unit 302 compares the IDRC to the threshold. The result of the comparison indicates whether the current channel quality is acceptable or not. The system determines a target percentage of time when the channel quality should be acceptable. In the present example, the target is set to 30%. The target is variable and may be adjusted during operation. Alternate systems may implement other target values or schemes. The output of compare unit 302 is a binary {1, 0}, wherein a 1 indicates acceptable channel quality and a 0 unacceptable, i.e., below threshold.

Continuing with FIG. 5, the output of compare unit 302 is provided to an IIR filter 304, wherein in the present example the time constant is set to 0.5 s. Alternate time constants could be implemented. From IIR filter 304 the filtered output is provided to a compare unit 310 for comparison with an input value, in the present example the input value is 0.3. If the result of the comparison is above the input value, a signal is provided to up/dn accumulator 308 to increase the threshold for determining channel quality. This indicates the channel quality indicator from compare unit 302 is 1 more than 30%. Else, if the comparison is below the input value, then the signal provided to up/dn accumulator 308 instructs increase of the threshold. The output of up/dn accumulator 308, is provided to summing unit 312. Summing unit 312 sums the outputs of up/dn accumulator 308 and IIR filter 306, wherein the input from IIR filter 306 provides a general bias for the threshold to compare unit 302. The result of the summation is provided to compare unit 302. The channel estimate indicator is taken from the output of compare unit 302. In this way, the scheduler maintains the channel estimate indicator or ChannelCondition Information to identify the percentage of good times when channel condition is good, i.e., channel peaks.

The SectorLoad may be incorporated into the scheduler by measuring the amount of BE and EF flows. Finally, the actual decision metric used by the scheduler may not explicitly include the ChannelCondition and SectorLoad measurements. The required DelayBound per user may be adaptively selected by measuring the fraction of EF users that may not meet their delay bounds for a certain fraction of transmitted IP packets.

A parameter used by some schedulers is referred to as the "QoS class index" of a flow, which defines the relative priority for that flow. There are a variety of methods by which the QoS classes may be determined. Within a given QoS class, different flows may have very different traffic types. The QoS class index is an indication to the required priority level by a flow, and not an indicator to the statistical behavior of the traffic.

In one embodiment, the QoS class index is a non-negative integer value selected for the scheduler to provide higher priority to flows having higher QoS class indices. Here, QoS class index of 0 corresponds to BE/AF flows; wherein the BE flows are special cases of AF flows where the minimum required throughput value is set to zero. QoS class indices of 1 and higher correspond to EF flows.

Note, higher QoS classes are given higher priority; however BE data will not necessarily be scheduled for transmitted after all EF data waiting in the queues are transmitted. As an example, the scheduler may schedule a multi-user packet to transmit a number of EF bits that are approaching a deadline. In the same transmission instance, the scheduler may also include BE data from users with compatible DRCs, i.e., transmission formats, while not including EF bits from users with incompatible DRCs.

A QoS flow may be approximately characterized by three parameters: (1) distribution of the IP datagram size, (2) distribution of the interarrival time between IP datagrams, and (3) delay bound relative to the time-stamp of the IP datagram after which the contents of the datagram becomes useless.

For BE/AF flows, the delay bound is much less stringent than EF flows, so it won't be considered for BE/AF flows, wherein AF is Assured Forwarding flows. For EF flows having a same delay bound but differing in distribution of the IP datagram size and inter-arrival time, the scheduler is designed to behave almost linearly. For example, a given flow having the same delay bound and packet size distribution as a VoIP flow, but having half the inter-arrival time distribution would approximately behave the same as two VoIP flows. Similarly, a flow having the same delay bound and inter-arrival time distribution, but twice the datagram size distribution as a VoIP flow, would also approximately behave as two VoIP flows to the scheduler. Non-integer multiples of packet size and inter-arrival time may be easily envisioned to be aggregations of a basic "unit" flow type.

The delay bound, however, has a very different effect on the scheduler than the datagram size and interarrival time distributions. The scheduler treats flows with lower delay bounds with higher priority. In some sense, setting the delay bound of a flow to a lower value is a soft way of increasing its QoS class index.

As discussed previously hereinabove, scheduling of transmissions is related to admission control, wherein admission control determines when a user or flow is accepted for processing and scheduling then determines when and how such flows will be transmitted. In other words, admission control determines which data will be eligible for inclusion in a transmission instance, and scheduling then determines the specific data, formats and order of the transmission instances. Therefore, scheduler operation may impact the admission control scheme used in a given system.

According to one embodiment, as system load increases, typically the BE/AF flows are scheduled such that each suffers degradation fairly. For EF flows, however, degradation is typically uneven. More specifically, lower QoS classes are degraded first in an attempt to maintain higher QoS classes functioning properly. Within a given EF QoS class, and ignoring the differences in delay bound settings, users with lower geometries are degraded to keep as many users as possible receiving the desired performance. This approach is taken to maximize the number of EF users supported. For homogeneous EF flows, the EF users are degraded unevenly starting with the lowest geometry users and propagating to higher geometry users. This approach has several consequences which are treated outside the scheduler, and more specifically, by admission control processing. Some of these consequences are illustrated in the following examples.

Figure 6:
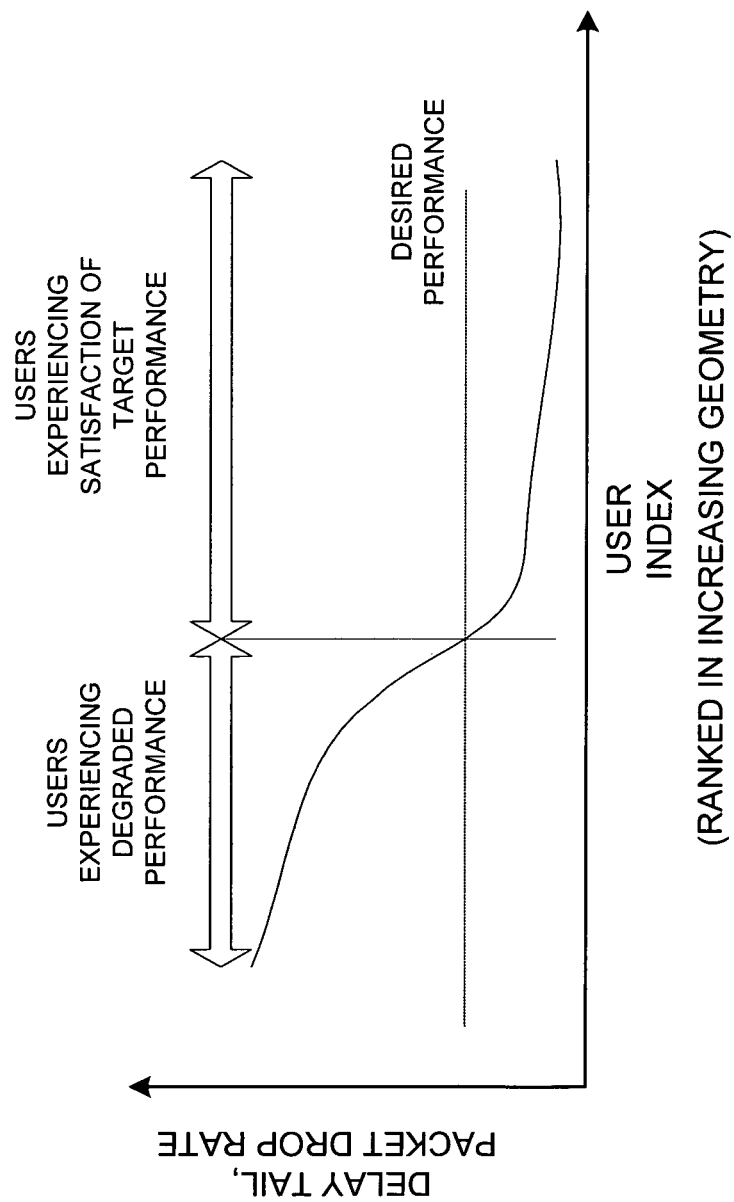
FIG. 6 illustrates behavior of a scheduler in presence of Expedited Forwarding (EF)-only users with a single traffic type.

This functionality of the scheduler is illustrated in FIG. 6, wherein flows are shown in sorted order according to geometry, with geometry increasing to the right. Given the current system load, the scheduler gives lower priority to lower geometry users to maximize the number of QoS flows receiving a desired QoS. The level of low geometry users propagates to the right with increasing congestion. The scheduler degrades the service received by such users by giving them lower priority. However, it is not responsible of completely taking out a flow, which would typically be the function of admission control and other performance monitoring blocks.

Consider a situation wherein all users have a single flow and have the same QoS class, such as a VoIP flow, and the highest geometry user asks for a very high throughput EF flow. The scheduler may allocate all FL slots to the highest geometry user, even if this means no transmissions to other user. Generally, a decision of admission for the flow is handled by admission control processing, which considers the current loading of the system. When admission control admits the flow, the scheduler performs any basic functionality and allocates all FL slots to that user. Note, degrading lower geometry users first does not necessarily mean the scheduler maximizes the number of EF users having acceptable receive performance. The scheduler may maximize such number if all users have a same QoS parameter(s) and a same traffic type (e.g. VoIP only).

If a low geometry user whose service is degraded by the scheduler due to mild congestion is asking for a very low throughput (e.g., 1 Byte every second), the scheduler may not give the requested or desired throughput to this user even though this would not effect the FL performance. Again, it is the responsibility of the admission control to anticipate scheduler operation with respect to this user given the current system load. In this case, the admission control may force the scheduler to provide service to this user by increasing its QoS class index.

For the following discussion, consider homogeneous EF traffic as a scenario wherein all users are EF users with a same traffic model. The scheduler first creates a list of candidate transmission instances for a set of single-user and multi-user transmission formats. Single user formats are stuffed with bits from the corresponding users' queues. Multi-user formats are stuffed with bits from the queues of users having compatible DRCs.

The scheduler then assigns a packet metric to each of the candidate instances and selects the candidate transmission instance corresponding to the largest packet metric. The packet metric may be a "throughput polynomial," wherein a comparison operation is defined as the "lexical" comparison providing a well defined maximization.

Consider the packet metric for the special case wherein all users are EF users and each user has one EF flow of the same type, e.g., a VoIP-only system, and a multi-user transmission format, wherein to create a multi-user transmission instance for this format, bits are stuffed from the queues of the users with compatible DRCs. Among these users, bits are selected based on the time-stamp of the corresponding IP datagrams on a first-in first-out basis. The delay bounds are assumed to be the same for this example. Among the bits having the same time-stamps, selection follows the order in the IP packet, and among different users, selection is performed in a manner so as to minimize the number of users having data in the packet.

The payload polynomial of a transmission instance may then be given as:

$$p(x) = B_D z^{-D} + B_{D-1} z^{-D+1} + \ldots + B_1 z^{-1} + B_0$$

wherein $B_n$ represents the number of bits included in the candidate transmission instance incurring a delay of n slots. The value of D may be equal to the delay bound as bits may be taken out of the queue when such bits have been in the queue for a time period exceeding the delay bound, and thus incur more than D slots of delay.

Figure 7:
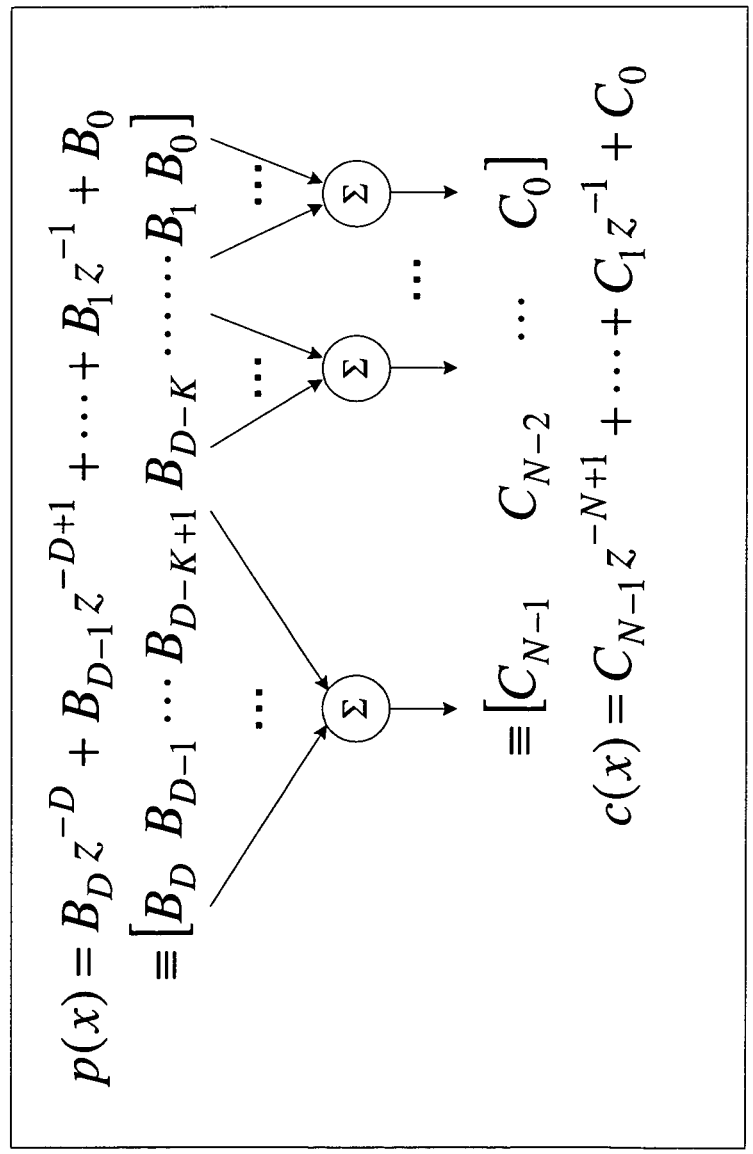
FIG. 7 illustrates calculation of condensed payload polynomial $c(z)$ from the payload polynomial $p(z)$.

The throughput polynomial is obtained by filtering and subsampling the payload polynomial. One method is to segment the coefficient vector of the payload polynomial into N groups and then sum the coefficients within each group to obtain a condensed representation of the payload polynomial. The throughput polynomial is then obtained by dividing the condensed payload polynomial by the expected number of slots for the candidate transmission instance to be decoded by all users of interest. The procedure is illustrated in FIG. 7, wherein the top row is the payload polynomial p(x), and the bottom row is c(x) which is the condensed representation of the payload polynomial. The variable x is a transmission instance index.

The throughput polynomial is then given as:

$$T(z) = c(z)/N_g$$

wherein $N_g$ is a "generic" span for the transmission format under consideration and the method of its calculation is discussed hereinbelow. The resulting throughput polynomial is then used as the packet metric in the selection of a candidate transmission instance among a set of various other alternatives, each similarly obtained.

Note the above described packet metric suggests a trade-off between latency enforcement and throughput. If N−1 were selected to be equal to D, that is if c(x)=p(x), then the packet metric would enforce transmission of the bits incurring the largest delay first. Subsequently, bits incurring the next largest delay would be considered in selection of a candidate transmission instance. This is a result of the "lexical" comparison used in comparing the packet metrics (i.e. throughput polynomials). In this way, the comparison begins by identifying the highest order of each polynomial. If one polynomial is of a higher order, then that polynomial is defined as the larger polynomial. If both have a same order, then the coefficients are compared starting with the highest order; when a higher coefficient is found in one polynomial, that polynomial is defined as the larger polynomial.

Segmentation of the coefficients of p(x) to obtain c(x), implicitly ignores differences in the incurred delay corresponding to the bits within each segment. In return, there is a maximizing of the throughput which now has more flexibility. The most flexibility in maximizing throughput would be obtained if all coefficients of p(x) were combined in a single segment (e.g., c(x) of order zero).

In one example, two segments (e.g., c(x) of order one) provides a compromise. The largest order term has the greatest impact. When there is a tie among various candidate instances, the terms of c(x) would be considered. Therefore, it may not be necessary to segment the coefficients of p(x) into more than two segments. This results in a single parameter to optimize, which we will denote by α and call "the delay fraction." In summary, with two segments, c(x)=(hi2) z−1+ (hi), where "hi2" and "hi" are the number of bits in each segment, respectively. More specifically, hi2 is the number of bits included in the candidate transmission instance incurring a delay larger than a times the delay bound; and, "hi" is the number of bits incurring a smaller delay.

For the case of users having all EF traffic, but with different traffic models (e.g., different delay bounds), the argument is modified. Bits with smaller delay bounds are to be part of the hi2 segment sooner than the bits with larger delay bounds. A natural way to accomplish this is to use β times the delay, as opposed to "delay" alone, in stuffing bits into the candidate transmission instances and in determining when bits are to become a part of the hi2 gear.

In general, β is designed to be proportional to one over the delay bound. A result of this is that EF bits with lower delay bounds will tend to have priority over EF bits with larger delay bounds.

Figure 8:
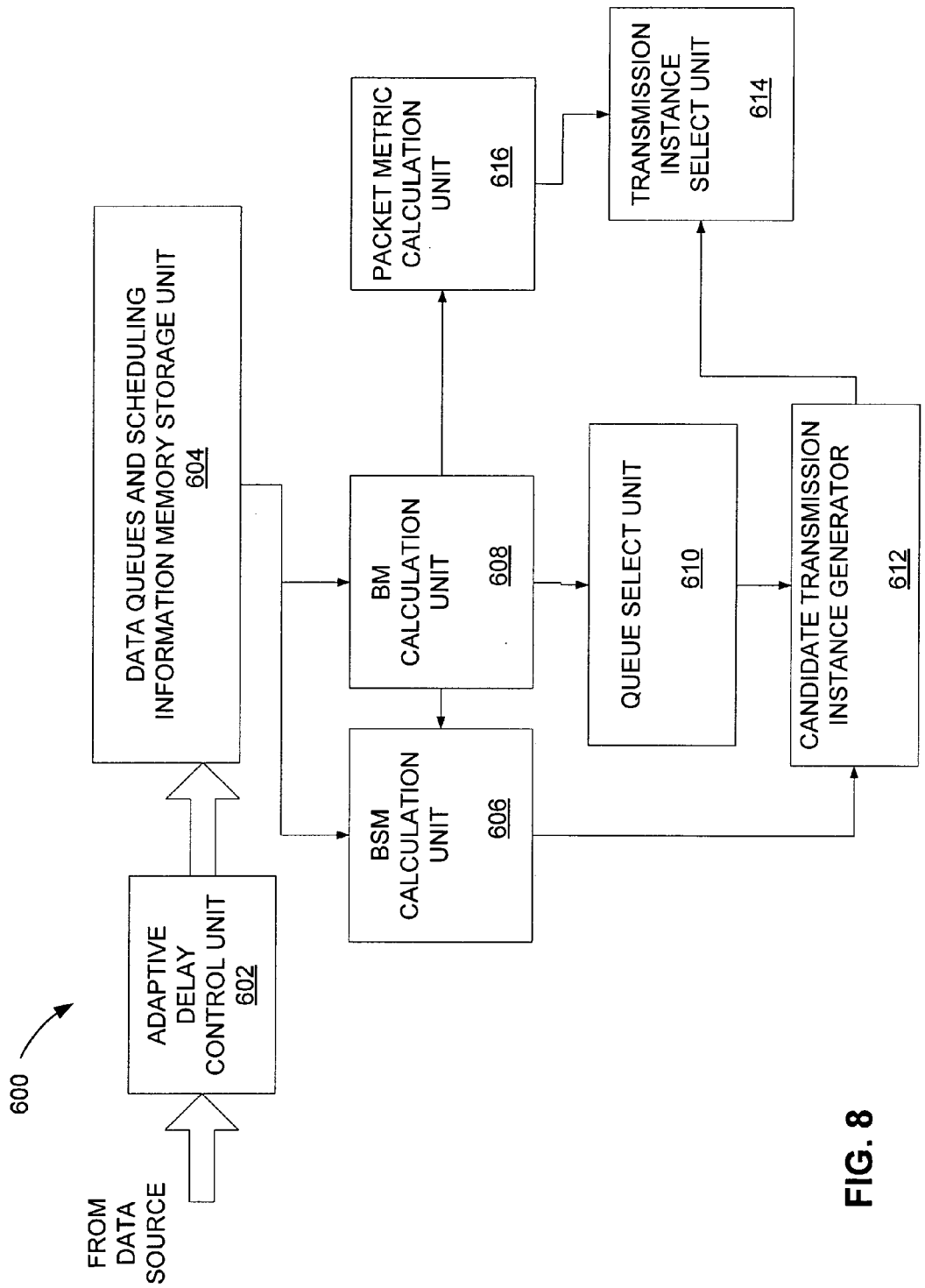
FIG. 8 illustrates a scheduler according to one embodiment.

FIG. 8 illustrates a scheduler according to one embodiment. Scheduler 600 includes an adaptive delay control unit 602 coupled to a memory storage unit 604 adapted for storing and maintaining queue information. Memory storage unit 604 also stores information relating to each queue, including delay and/or throughput sensitivity, priority class, such as EF, BE, etc., and other information which may be designed into the scheduler, such as other QoS information. The queue data and information stored in memory storage unit 604 is provided to bit metric calculation unit 608 and bit stuffing metric calculation unit 606. These units generate a bit metric and a bit stuffing metric, respectively. The calculated bit metric is provided to the bit metric calculation unit 608, the packet metric calculation unit 616, and the queue select unit 610. The bit stuffing metric and the selected queues are provided to candidate transmission instance generator 612. The packet metric from packet metric calculation unit 616 and the set of candidate transmission instances generated by generator 612 are provided to transmission instance select unit 614.

Figure 9:
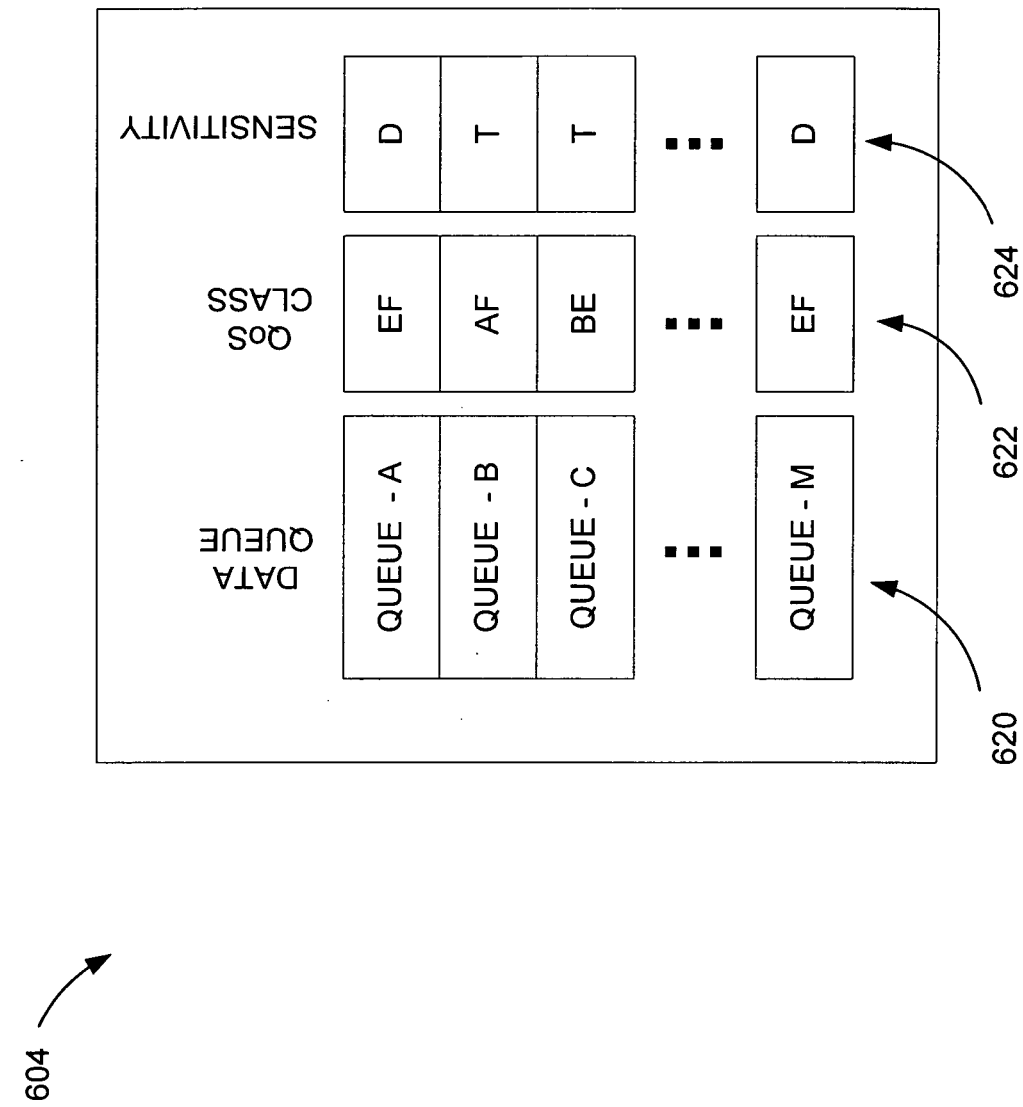
FIG. 9 illustrates a portion of the scheduler of FIG. 8 according to one embodiment.

FIG. 9 details the memory storage unit 604 as storing multiple queues having pending data. The queue data is stored per flow as queue data 620. For each queue 620 there is a corresponding QoS class or priority class 622 and a sensitivity designator 624.

Figure 10:
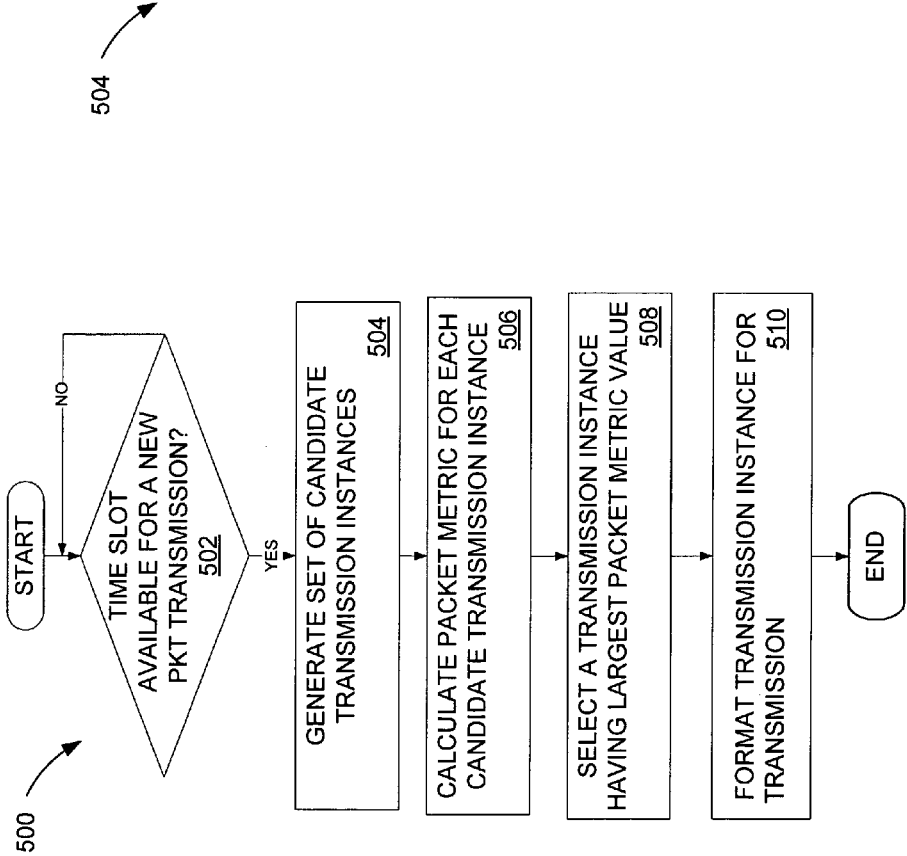
FIG. 10 illustrates a scheduling algorithm for implementing adaptive delay management of transmissions.

FIG. 10 is a flow chart illustrating the scheduling method according to one embodiment. The method 500 first determines at decision diamond 502 if the FL is busy, i.e., if the time slot is available for a new packet transmission. If the slot is available for a new packet transmission, the scheduler generates a list of candidate transmission instances based on a subset of defined and derived transmission formats at step 504. The packet metric corresponding to each candidate transmission instance is calculated at step 506. At step 508, the scheduler selects a transmission instance having a greatest value for the packet metric. At step 510 the transmission instance is formatted for transmission.

Figure 11:
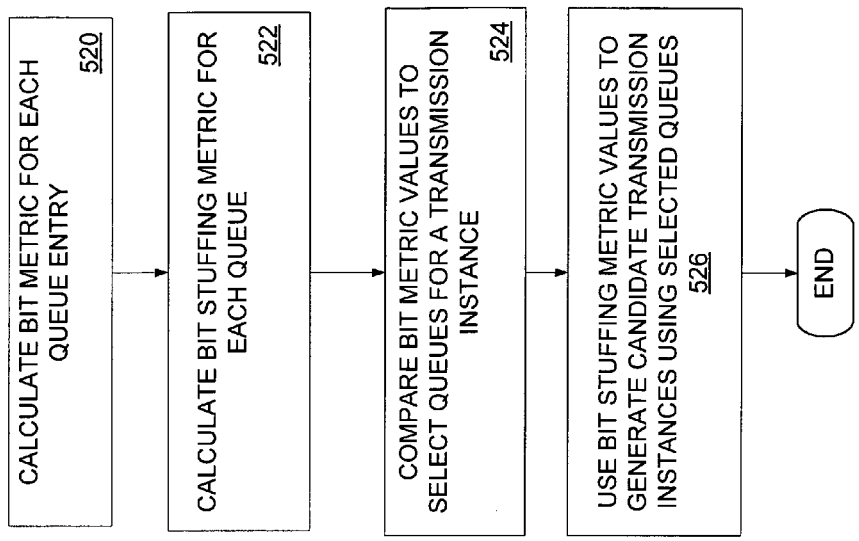
FIG. 11 illustrates a portion of the scheduling algorithm of FIG. 10 according to one embodiment.

FIG. 11 illustrates one embodiment for generating a set of candidate transmission instances and implementing step 504 in method 500. At step 520 the scheduler calculates a bit metric for each queue entry. At step 522 the scheduler calculates a bit stuffing metric for each queue. The bit metric values are compared to select a set of queues for a transmission instance, step 524. The bit stuffing metric is used to generate candidate transmission instances using the set of queues, step 526. Examples of methods and means for such calculations and comparisons are provided hereinbelow.

Note in one embodiment, a candidate transmission instance with a single-user format is generated for each user that has pending data. The transmission format is set to the canonical format corresponding to that user's DRC. For users from which NULL DRC have been received, a candidate transmission instance is created only if the user has pending "EF" data. For BE/AF users, NULL DRCs aren't served since these users try to maintain low drop rates at the Radio Layer Protocol (RLP) layer.

A candidate transmission instance with a multi-user format is generated for each defined and derived "canonical" multi-user format. A flag may be used to allow derived formats in this stage.

Note, the set of candidate transmission instances generated in step 506 are based on "canonical" formats. That is short packets are not included in this step. The purpose is to help bias the scheduler towards higher geometry users and to avoid low geometry users from abusing short packets and thus reducing FL throughput. The short packets are used in a packing efficiency maximization step (as illustrated in FIG. 12) when the selected candidate transmission instance has a payload which fits into a short packet.

Figure 12:
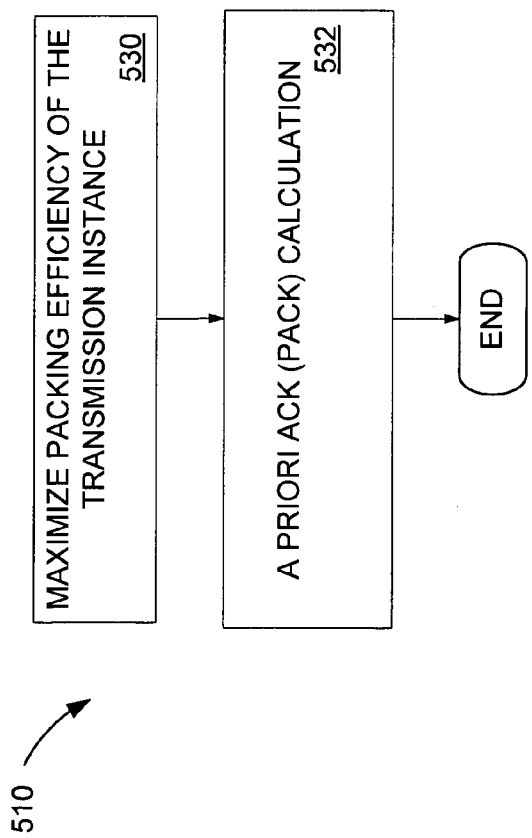
FIG. 12 illustrates a portion of the scheduling algorithm of FIG. 10 according to one embodiment.

A packing efficiency maximization step may be performed consistent with FIG. 12. In this step, the selected candidate transmission instance may go through a change of transmission format according to the following rules.

(1) If the selected candidate transmission instance contains a single user's data, the re-selected format is allowed to be either a single-user format compatible with the user's DRC or a multi-user format.

(2) If the selected candidate transmission format contains two or more user's data, the re-selected format may only be another multi-user format. In either case, the smallest format capable to carry the payload is selected. This post-conversion is further controlled by flags that may avoid conversions to some multi-user formats.

Figure 13:
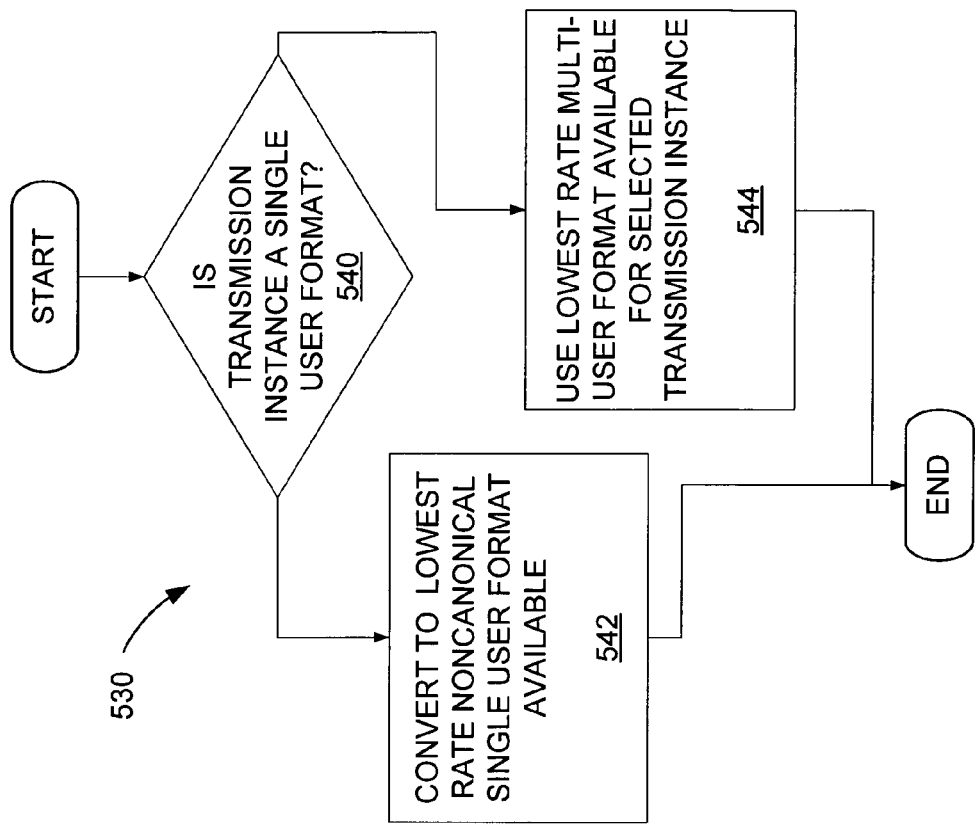
FIG. 13 illustrates a portion of the scheduling algorithm of FIG. 10 according to one embodiment.

In one embodiment, the step 510 of formatting the transmission instance further includes a step 530 where the scheduler maximizes a packing efficiency of the transmission instance, and a step 532 wherein the scheduler performs an a priori ACK calculation, see FIG. 12. Additionally, step 530 may include the method as illustrated in FIG. 13. The transmission instance is first evaluated to determine if a single user format is used, decision diamond 540. If a single user format is used, the Each step is further detailed hereinbelow.

In one embodiment, the scheduler determines the maximum span corresponding to the DRCs of the users for which the selected transmission instance will be carrying data bits. The scheduler counts the designated number of transmission slots. If there are any users which have not yet acknowledged correct receipt of the transmitted information, i.e., transmitted an ACK message, and if there is pending data in any of the queues, the AN terminates the transmission.

An alternate embodiment includes specific means and methods for completing the method 500 illustrated in FIG. 10, including, but not limited to, bit stuffing to create each candidate transmission instance and calculation of a packet metric.

Packet metric calculations are performed in step 508, while bit stuffing is part of formatting the transmission instance of step 508. In general, a single-user transmission instance may be stuffed with bits from one or more flows of the same user. A multi-user instance with a "defined" format, such as one defined as in Table 1, may be stuffed with bits from one or more users, wherein such users have transmitted DRCs compatible with the multi-user format. A multi-user instance with a "derived" format may be stuffed with bits from one or more users which transmitted DRCs compatible with the multi-user format and which satisfy the additional requirement of "soft compatibility." A DRC is considered soft compatible to a derived multi-user format if the expected number of slots to decode the corresponding "defined" format is less than or equal to the span of the derived format. The expected number of slots may be obtained by comparing the Signal-to-Interference and Noise Ratio (SINR) required for the received DRC to the SINR required to decode the derived format successfully (e.g., under Average White Gaussian Noise (AWGN) conditions). Alternately, the expected number of slots may be determined by comparing the requested rate to the effective data rate of the derived format.

The following description assumes QoS classes including: i) BE/AF; and one class of EF. The method allows extension to multiple EF classes as well. According to the present embodiment, each bit pending in the queue is assigned a bit metric which is given as a polynomial of the form:

$$b_i(z)=[hi2]z^{-2}+[hi]z^{-1}+[lo]$$

wherein i is an index of the bit, and only one of the three coefficients {hi2, hi, lo} is allowed to be non-zero. Note, although the description is given as bit-level, typically all bits in an IP datagram have the same metric and the packet metric calculations may not necessarily involve bit-level accumulations.

Let $\delta$ be the current delay associated with a bit from an EF flow. Set the following definitions for hi2 and hi:

$$hi2=\beta\delta+\mu \text{ if } \delta>\alpha\text{DelayBound}$$

and $$hi=\beta\delta+\mu \text{ if } \delta\leq\alpha\text{DelayBound},$$

wherein $\beta$ is a parameter associated with the EF flow and is inversely related to the delay bound; wherein $\mu$ is a large number; and wherein $\alpha$ is a fixed scalar, for example 0.25, and is independent of the EF flow type.

For a BE/AF flow, set lo as follows:

$$lo = \frac{1}{AvgThroughput - TrgtThroughput}$$

wherein AvgThroughput is the average throughput of the corresponding user and TrgtThroughput is the minimum desired throughput for that user. For a BE user, TrgtThroughput is set to zero. The packet metric (e.g., throughput polynomial) is then obtained as follows:

$$PacketMetric=AccumulatedBitMetric/Ng$$

wherein Ng is the generic span of the defined or derived candidate transmission instance under consideration and the accumulated bit metric (AccumulatedBitMetric) is the sum of the bit metrics corresponding to all bits included (or stuffed) in the candidate instance. The value Ng may be set to the nominal span of the defined or derived type. Alternatively, it may be set to one, in which case the packet metric will be equal to the accumulated bit metric. In this case, the scheduler will function to maximize payload per transmission instance rather than throughput per transmission instance. This may have the undesirable effect of creating DRC insensitivity, thus causing degraded performance wherein such degradation may not follow the behavior illustrated in FIG. 6. Another approach is to set Ng to a "pseudo-span" which may be set to one for 1 and 2 slot high rate packets, set to two for 4 slot packets, etc., thus distinguishing high rate packets based on payload, while low rate formats are discouraged by setting Ng to larger values.

The following properties provide a bias toward high geometry users to the scheduler:

(1) If a DRC is compatible with a multi-user format, it is also compatible with all multi-user formats of lower nominal data rate; and (2) The scheduler uses the "throughput" polynomial as a selection device.

One design uses a large value µ term in the definition of the hi and hi2 coefficients for bit metrics. The bits are stuffed in order according to the value of βδ since µ is common to all bits. The packet metric is calculated as if the corresponding entry of the bit metric is changed to one thus resulting in a packet metric proportional to the throughput polynomial. This eliminates the effect of βδ in the packet metric for packet metric calculation.

Note, as described above, the scheduler applies a fixed DelayBound to all users. Typically, users experiencing good coverage require only a fraction of the DelayBound. As the number of users increases, the degradation starts first at the weakest users, whereas users at high geometries may not be strongly effected by the load.

One embodiment adaptively sets the delay bound and related parameters (e.g., α) by measuring the fraction of good EF users. The DelayBound used by the scheduler may be iteratively increased or decreased to maintain the fraction of good users at a desirable level. A simple first-order loop with a lower bound for DelayBound is implemented in one embodiment.

In the scheduler described hereinabove, the method defining the bit metric for BE/AF users uses the following calculation:

Bit metric=1/[AvgThroughput−TargetThroughput].

Other bit metric definitions may be implemented for different systems, operational goals, and design The FL transmission formats compatible with each DRC index are also listed in Table 1 for two sets of protocol subtypes defined in the 1xEV-DO Rel-0 and Revision A specifications, respectively, including proposed changes in recent contributions to Rev-A defining compatible multi-user formats for DRC indices of 0x0, 0x1, and 0x2. A transmission format, as in the Rev. A specification, is represented by the triplet (PacketSize, Span, PreambleLength). "PacketSize" is the number of bits the transmission format carries including Cyclic Redundancy Code (CRC) and tail. "Span" is the nominal (e.g., maximum) number of slots which a transmission instance would take up on the forward link. The "PreambleLength" is the total number of preamble chips. As in the Revision A of 1xEV-DO specification, "canonical" transmission formats for each DRC are indicated in bold. Note, Rel-0 defines only single-user transmission formats, whereas certain subtypes in Revision A define both single-user and multi-user formats. In addition, in Revision A, multiple transmission formats may be defined for each DRC index. The AT tries to receive packets at each of these formats. The multi-user formats are distinguished by their unique MAC indices, i.e., the preamble for each multi-user format uses a distinct Walsh cover. The single-user formats all use the MAC index assigned to a user.

TABLE 1

Transmission Formats for 1xEV-DO Rel.0 and Rev.A

| DRC Index | Rate (Kbps) | Rev0 Transmission Format | RevA Single User Transmission Formats | RevA Multi-User Transmission Formats |
|---|---|---|---|---|
| 0x0 | 0.0 | None | (128, 16, 1024), (256, 16, 1024), (512, 16, 1024), (1024, 16, 1024) | None |
| 0x1 | 38.4 | (1024, 16, 1024) | (128, 16, 1024), (256, 16, 1024), (512, 16, 1024), (1024, 16, 1024) | None |
| 0x2 | 76.8 | (1024, 8, 512) | (128, 8, 512), (256, 8, 512), (512, 8, 512), (1024, 8, 512) | None |
| 0x3 | 153.6 | (1024, 4, 256) | (128, 4, 256), (256, 4, 256), (512, 4, 256), (1024, 4, 256) | (128, 4, 256), (256, 4, 256), (512, 4, 256), (1024, 4, 256) |
| 0x4 | 307.2 | (1024, 2, 128) | (128, 2, 128), (256, 2, 128), (512, 2, 128), (1024, 2, 128) | (128, 4, 256), (256, 4, 256), (512, 4, 256), (1024, 4, 256) |
| 0x5 | 307.2 | (2048, 4, 128) | (512, 4, 128), (1024, 4, 128), (2048, 4, 128) | (128, 4, 256), (256, 4, 256), (512, 4, 256), (1024, 4, 256), (2048, 4, 128) |
| 0x6 | 614.4 | (1024, 1, 64) | (128, 1, 64), (256, 1, 64), (512, 1, 64), (1024, 1, 64) | (128, 4, 256), (256, 4, 256), (512, 4, 256), (1024, 4, 256) |
| 0x7 | 614.4 | (2048, 2, 64) | (512, 2, 64), (1024, 2, 64), (2048, 2, 64) | (128, 4, 256), (256, 4, 256), (512, 4, 256), (1024, 4, 256), (2048, 4, 128) |
| 0x8 | 921.6 | (3072, 2, 64) | (1024, 2, 64), (3072, 2, 64) | (128, 4, 256), (256, 4, 256), (512, 4, 256), (1024, 4, 256), (2048, 4, 128), (3072, 2, 64) |
| 0x9 | 1228.8 | (2048, 1, 64) | (512, 1, 64), (1024, 1, 64), (2048, 1, 64) | (128, 4, 256), (256, 4, 256), (512, 4, 256), (1024, 4, 256), (2048, 4, 128) |
| 0xA | 1228.8 | (4096, 2, 64) | (4096, 2, 64) | (128, 4, 256), (256, 4, 256), (512, 4, 256), (1024, 4, 256), (2048, 4, 128), (3072, 2, 64), (4096, 2, 64) |

TABLE 1-continued

Transmission Formats for 1xEV-DO Rel.0 and Rev.A

| DRC Index | Rate (Kbps) | Rev0 Transmission Format | RevA Single User Transmission Formats | RevA Multi-User Transmission Formats |
|---|---|---|---|---|
| 0xB | 1843.2 | (3072, 1, 64) | (1024, 1, 64), (3072, 1, 64) | (128, 4, 256), (256, 4, 256), (512, 4, 256), (1024, 4, 256), (2048, 4, 128), (3072, 2, 64) |
| 0xC | 2457.6 | (4096, 1, 64) | (4096, 1, 64) | (128, 4, 256), (256, 4, 256), (512, 4, 256), (1024, 4, 256), (2048, 4, 128), (3072, 2, 64), (4096, 2, 64) |
| 0xD | 1536.0 | None | (5120, 2, 64) | (128, 4, 256), (256, 4, 256), (512, 4, 256), (1024, 4, 256), (2048, 4, 128), (3072, 2, 64), (4096, 2, 64), (5120, 2, 64) |
| 0xE | 3072.0 | None | (5120, 1, 64) | (128, 4, 256), (256, 4, 256), (512, 4, 256), (1024, 4, 256), (2048, 4, 128), (3072, 2, 64), (4096, 2, 64), (5120, 2, 64) |

As a reminder, a transmission instance refers to a transmission format with a particular set of bits from one or more queues selected to be transported by it. A candidate transmission instance refers to a transmission instance to be evaluated by a scheduler algorithm for possible transmission. The multi-user transmission formats (1024,4,256), (2048,4,128), (3072,2,64), (4096,2,64), and (5120,2,64) are referred to as the canonical multi-user transmission formats. The multi-user transmission formats (128,4,256), (256,4,256), and (512,4,256) are referred to as "non-canonical multi-user formats." The derived transmission formats are obtained simply by setting the span of the corresponding defined format to smaller values than the nominal value, as if obtained from the defined formats by early termination. In summary, transmission formats and instances may be canonical or non-canonical; single-user, or multi-user; and defined or derived. The term "nominal number of slots" will be used to refer to the maximum number of slots for a defined transmission format and the redefined maximum number of slots for a derived transmission format The following description of the scheduling means and methods considers an octet-based scheduling, in which the octets pending in various queues may be served in any amount (in units of octets). Typically, each flow will be stored as at least one queue of data. Therefore, each queue has specific QoS requirements associated therewith. The data is stored in each queue in octets. Scheduling may be performed wherein less than a full octet of data is put into a transmission instance or physical layer packet for transmission on the FL.

Note, certain applications may require frame-based scheduling, in which the (encapsulated) datagrams of the flow are to be served without fragmentation within physical layer packets. The octet-based scheduling means and methods may also be extended to frame-based scheduling.

Note also, admission control is closely related to scheduling, wherein admission control serves to admit/reject incoming flows based on the current system load and by predicting whether the incoming flow may be satisfactorily served (i.e., QoS targets met) without causing unacceptable degradation to the already admitted flows.

As used herein, "flow" refers to a data stream directed to a given user. The source of a flow may be one or more user applications, including, but not limited to, file downloads (ftp), web surfing (http), online gaming, or VoIP, among many others. A flow may also be generated by the communication system itself, such as signaling flows which serve to keep the system operational while maintaining the user session properly. Another example of a flow is a data stream generated by a test application, wherein the data stream is used to test at least a portion of the communication system.

In other words, a flow is a stream of data, and is part of a communication to at least one user. There are a variety of application flows, each having specific QoS requirements and tolerances. Each flow may have a different set of QoS requirements, such as target throughput and delay bound. Examples of such requirements are discussed specifically hereinbelow.

A user may have multiple, concurrent flows with different QoS requirements. Each flow may be generated either by a single application, such as for VoIP, ftp, signaling, etc. or it may be generated by multiple applications that are aggregated into a single flow by the Base Station Controller (BSC). If the BSC aggregates flows in this manner, the aggregated flow may appear to the scheduler as a single flow with well-defined QoS requirements. The scheduler may not be able to distinguish among data generated by different applications but contained in an aggregated flow. Another type of aggregation that may be performed by the scheduler is presented hereinbelow.

Each flow has at least one queue holding data for the First Time transmission (referred to as FTx) and may have additional queues for retransmissions, such as thee Radio Layer Protocol (RLP) ReTransmission queue (RTx queue of the flow x) and/or the MAC layer retransmission queue (delayed Automatic Repeat request (ARQ), or the Delayed ARQ (DARQ) queue). In one embodiment, every octet in each queue has a well-defined timestamp, by which the scheduler may determine the current delay incurred by the octet. The timestamps are assigned to bursts of data such as (encapsulated) datagrams, implying that each octet of the data burst has the same timestamp. Individual datagrams may carry multiple application level frames, which may have been generated by an application at different times. It is assumed that the application frame timestamps are not known to the scheduler. This assumption is appropriate, since the complete datagram is to be successfully received by a user before any of the application frames carried by it may be parsed by the receiving end application.

In the design of a scheduler according to one embodiment, three major QoS classes are considered. Best Effort (BE) is defined as in the glossary, and specifically refers to flows which may typically afford relatively high end-to-end delays, but require low Bit Error Rate (BER). Although there is no minimum throughput requirement, the size of the data to be transmitted may be high. Examples of flows that may be considered BE include file downloads (ftp) and web surfing (http). Assured Forwarding (AF) refers to flows which are, in general, similar to the BE flows as tolerating some level of delay; however, AF flows differ from BE flows as AF flows typically have a minimum average throughput. One example of an application classified as an AF flow is the video stream generated by a videoconferencing application. Expedited Forwarding (EF) refers to flows which typically, but not necessarily, have a low throughput requirement, and have stringent end-to-end delay requirements. The reliability requirement may not be as strict as for BE flows; it may be acceptable to lose a small fraction of application data, such as, for example, 1 to 2%. Examples of applications classified as EF flows include, but are not limited to, VoIP and online gaming.

With respect to scheduling means and methods, the difference between BE and AF flows is in the minimum throughput requirement, which is zero for BE flows. Otherwise, these two QoS classes are similar. To further differentiate specific flows, consider the EF class, which may include a variety of different type applications. Within the EF class of flows there may be flows with different priorities. As an example, applications such as VoIP and the audio part of a videoconferencing application may be considered as higher priority than the video part of the videoconferencing application. Online gaming may be considered to have lower priority than both the audio and video applications.

In addition to the flows generated by user applications, a system supporting IS-856 has internally generated flows, such as the signaling flow that is required to keep the system operational, and the flows generated by test applications used to test the system.

Typical QoS requirements may be stated in terms of a variety of considerations described by variables, including but not limited to, delay bound, target throughput, reliability, jitter, etc.

The delay bound is identified by the variable referred to as "DelayBound," which is a parameter specified for each flow referring to the maximum delay within which the datagram is to be successfully delivered to the user. The DelayBound is measured relative to the timestamp of a datagram, which in the present embodiment is an octet. Note, this is different from the end-to-end delay bound which would involve delay-budget components other than the FL delay. In one embodiment, once the DelayBound of a datagram is reached, the datagram is taken out of the queue. In other words, if the datagram cannot be sent within the specified delay bound, the datagram is discarded.

The target throughput is identified by the variable referred to as "TargetThroughput" which is another specified QoS parameter. The target throughput refers to the minimum required average throughput for a flow. The averaging of the throughput may be defined via a first-order Infinite Impulse Response (IIR) filter with an appropriate time constant. In one embodiment, the time constant is set to 1 ms.

A third QoS requirement may be reliability. Typically, the physical layer of the system provides 1% Packet Error Rate (PER) which may not be sufficient for applications requiring an exceptionally low error rate, such as file downloads. Therefore, in order to further reduce losses over the air, retransmission mechanisms may be utilized. Typical retransmission mechanisms are RLP retransmissions and MAC layer retransmissions, such as RTx and DARQ queues, respectively. Beyond this, Transmission Control Protocol (TCP) may be used as a transport layer protocol for an application to provide further reliability.

In one embodiment, the scheduler is designed to maximize the system capacity while providing fairness across flows and meeting certain priority and QoS requirements for each the flows. The concepts of capacity and fairness depend on the QoS requirements of individual flows. For BE flows, capacity may be defined as the total BE throughput transmitted by a sector. For EF flows of a particular type capacity may be defined as the number of users that may be supported while meeting their QoS requirements. In one example of EF flow scheduling, the system defines the VoIP capacity such that the number of VoIP users is selected as that number which will achieve 95% of the users, on average, receiving 98% of the application data frames (or octets) successfully. In one example, success is determined by frames received within the specified DelayBound and free of transmission errors. Alternate success criteria may also be used. To achieve fairness across flows a Proportional Fairness (PF) criteria may be used for scheduling BE flows, and scheduling EF flows according to a priority criteria. In this way, as the system load increases, the BE flows suffer even degradation, i.e., BE flows are degraded without differentiation.

For EF flows, it is desirable to have an uneven degradation across users as the system load increases or congestion occurs. The degradation is first felt by those EF flows considered as having lowest priority. Among the EF flows having similar QoS requirements and a same level of priority, degradation is to first affect the flows for users having the worst channel conditions. With this approach, as the system congestion increases, the largest possible number of EF flows may satisfy their QoS requirements. This approach usually results in an approximately inverse relationship between a user's channel condition and the delay statistics of its EF flows. This property is referred to as "Delay Fairness."

A "transmission format" is a triplet of the form (PacketSize, Span, PreambleLength) which describes certain parameters of an FL packet. PacketSize refers to the physical layer payload size in bits, Span refers to the maximum number of slots that a packet of that format may be transmitted, and PreambleLength refers to the preamble duration in chips.

In a system supporting IS-856, link adaptation is used to determine the FL transmission data rate for each user. Each AT transmits a data request indicating a maximum data rate at which the AT may receive data. The data request is referred to as a Data Rate Control (DRC) message. The DRC message format uses a variety of DRC indices, each specifying a transmission format. The AT sends the DRC message on a DRC channel. For each valid DRC index, except the NULL DRC in IS-856 Rel-O, there is one or more single-user and zero or more multi-user transmission formats which may be served on the FL to carry data to a user. Table 1 details the DRC indices as defined in IS-856. Additionally, Table 1 further includes the compatible transmission formats for each DRC index.

In the 1xEV-DO Rev-A specification, for each DRC index, one of the compatible single-user transmission formats is defined to be the canonical format for that DRC. Note, as used herein, the DRC corresponds to the specific format requested by the AT and identified by the DRC index. Generally, if an AT successfully decodes a packet transmitted using the canonical format corresponding to a given DRC, then such AT would also likely successfully decode a packet transmitted with any of the compatible noncanonical single-user formats or any of the compatible multi-user formats. This is with the exception of DRC indices: 0x0; 0x1; and 0x2. Note, as some multi-user formats compatible with a given DRC may have larger preamble lengths compared to the canonical format, these may not necessarily result in a data processing gain.

For any DRC, excluding all formats compatible with the DRC index 0x0 and the multi-user formats compatible with the DRC indices of 0x1 and 0x2, the payload size of a noncanonical format is typically less than or equal to that of the canonical format. Additionally, the span of a noncanonical format is typically larger than or equal to the span of the canonical format. If a user from which a DRC index of 0x0 (e.g., NULL rate request) has been received is served at any format, there is in general no guarantee of reliable reception of the packet. Also, for DRC indices of 0x1 and 0x2, the compatible multi-user transmission formats may not ensure sufficiently reliable reception, since the payload size and span of these formats do not satisfy this property.

In one embodiment the scheduler may not utilize multi-user packets to serve users from which the received DRC is 0x0, 0x1, or 0x2. Also, service to users from which NULL DRC (0x0) is received may be limited to certain conditions. These conditions may be designed into the system.

For multi-user transmission formats, if a given DRC is compatible with a given multi-user format, then the same DRC is compatible with all multi-user formats of lower data rates.

A "transmission instance" refers to the combination of a transmission format and the identities of data octets that may be carried by a packet of that format. For example, the set of MAC indices for the users to whom the packet is to carry data octets and a set of pointers to the corresponding queues indicating exactly which octets are to be carried in the packet may define the transmission format.

The scheduler may generate a set of hypothetical transmission instances, and then select one of these instances for transmission on the FL. The term used in this document to refer to any of these hypothetical transmission instances is a "candidate transmission instance."

In one embodiment of a scheduler incorporating adaptive delay management, various metrics are used by the scheduler, and include: 1) a bit stuffing metric; 2) a bit metric; and 3) a packet metric. The bit metric is used to select queues which are eligible for incorporation into a current transmission instance. The bit stuffing metrics determine the order in which bits (or octets), which are pending in various queues, are included in a given candidate transmission instance. Once a candidate transmission instance is created, a packet metric is calculated for the candidate transmission instance. The packet metric is then used to select a winning transmission instance from a set of similarly created candidate transmission instances. The packet metric of a candidate transmission instance is determined by simply summing up the bit metrics of all octets included in the candidate transmission instance and dividing the sum by the span of the transmission format of the candidate transmission instance:

$$PacketMetric[k] = \frac{1}{Span[k]} \sum_{i \in P[k]} BitMetric[i]$$

wherein k represents an index to a particular candidate transmission instance within a set of alternatives, Span[k] represents the span defined for the corresponding transmission format, P[k] represents the set of octets that are included in the candidate transmission instance, and BitMetric[i] represents the bit metric of the $i^{th}$ octet included in the candidate instance.

Therefore, the packet metric may be interpreted as an estimate of the "instantaneous throughput of the bit metric" if the candidate transmission instance were actually served on the FL.

In general, if the bit stuffing metric of an octet i is larger than the bit stuffing metric of another octet j then the bit metric of the octet i may be set larger than or equal to the bit metric of octet j. In this case, octets may be from different queues. Similarly, if the bit metric of an octet i is larger than that of another octet j, then the bit stuffing metric of the octet i should be set larger than or equal to that of octet j, i.e.:

BitMetric[i]>BitMetric[j] $\Rightarrow$ BitStuffingMetric[i]≧BitStuffingMetric[j]

BitStuffingMetric[i]>BitStuffingMetric[j] $\Rightarrow$ BitMetric[i]≧BitMetric[j]

This general guideline ensures an octet stuffed into a candidate transmission instance contributes to the packet metric at least by the same amount as another octet which is stuffed later.

All the metrics described herein, as well as alternate metrics, may be represented in polynomial form as follows:

Metric=$[MC0]+[MC1]x+[MC2]x^2+[MC3]x^3+[MC4]x^4+[MC5]x^5+[MC6]x^6+[MC7]x^7$ wherein the Metric may be any of the metric types and MC0, . . . , MC7 represent metric coefficients. The addition of two metrics and the multiplication (or division) of a metric by a scalar are defined as in polynomial algebra; wherein when two metrics are summed, the corresponding coefficients of the two polynomials are summed. When a metric is multiplied (or divided) by a scalar, each of the coefficients are multiplied (or divided) by the same scalar. This enables calculation of the packet metrics using the bit metrics calculated as given hereinabove.

The comparison operators ">, >=, ==, <=, <" are defined in the lexical sense, i.e., when two metrics are compared, first the coefficients of the highest degree terms are compared. If equal, then the coefficients of the next highest degree terms are compared, etc. Two metrics are equal, if all of the corresponding coefficients of the two polynomial representations are equal. The comparison operations are used for comparing bit stuffing metrics as well as for comparing packet metrics.

Bit Metrics, Bit Stuffing, and Packet Metrics

For bit metrics and bit stuffing metrics, only one term of the corresponding polynomial representations are nonzero at any given time. The degree of the nonzero term is the same for the bit metric and the bit stuffing metric for a given octet. The degree of this nonzero term, which will usually be referred to by the corresponding coefficient's name. MC0, . . . , MC7 will be called the "priority state" of the bit (stuffing) metric (or the corresponding octet). The definition of the comparison operation implies that the MC0 term corresponds to the lowest priority octets, and the and MC7 term corresponds to the highest priority octets. The priority state of a bit (stuffing) metric for an octet i is determined by the current delay incurred by the octet given as:

CurrentDelay[i]=CurrentTime−TimeStamp[i]

and by using an ordered set of thresholds known as the "priority thresholds" defined for the flow to which the octet belongs. The TimeStamp[i] is an appropriately defined timestamp for octet i. Each interval defined by the priority thresholds is mapped to a priority state. The priority thresholds and the mapping of the thus defined intervals to priority states may be specified to the scheduler for each flow separately. The CurrentDelay[i] of the octet is compared to these ordered sets of thresholds to determine the interval into which it falls. This, in turn, defines the priority state of the bit (stuffing) metric.

The above operation uses M priority thresholds and M+1 priority states for each flow. The value of M is set to 2 in one embodiment which is a software implementation of a scheduler. For each flow, two priority thresholds and three priority states are defined. These priority thresholds and priority states may typically remain unchanged during the lifetime of the flow, although each may be changed during operation via an appropriate
DSP-Driver Command.

For throughput sensitive traffic flows the bit metric is set to:

$$TS_{BM} = \frac{GoSFactor \cdot Thrghpt2DelayConvFactorBM}{\max(\varepsilon, AvgThroughput - TargetThoughput)}$$

and bit stuffing metric is set to:

$$TS_{BSM} = \frac{GoSFactor \cdot Thrghpt2DelayConvFactorBSM}{\max(\varepsilon, AvgThroughput - TargetThoughput)}$$

wherein:
1. The GoSFactor is a per-flow based defined parameter that is used to provide various levels of grade of service across flows.
2. The AvgThroughput is the filtered (averaged) total throughput of the flow, including the FFx, RTx, and DARQ queues of the flow. A first-order Infinite Impulse Response (IIR) filter with a time constant, e.g., as 600 slots (1 sec), is used for averaging.
3. The TargetThroughput is a per-flow-based defined parameter.
4. The Thrghpt2DelayConvFactorBM is a per-flow-based defined parameter.
5. The Thrghpt2DelayConvFactorBSM is a per-flow-based defined parameter.
6. The $\varepsilon$ represents a very small positive number.

For the bit stuffing metric of delay sensitive flows, the polynomial coefficient for the priority state is set as follows:

$DS_{BSM}$=AccelerationFactor*CurrentDelay+AccelerationOffset wherein the AccelerationFactor is a per-flow defined parameter. The AccelerationFactor normalizes the DelayBound which may be different for different flows. As an example, consider two different online games. Due to the different characteristics of the two applications, they may have different DelayBound settings specified to the scheduler, however, one game does not necessarily have a higher priority than the other application. It may be desirable for the scheduler to treat both applications with equal priority. Assume the first game has 300 ms of delay bound and the second game has 150 ms. Then, at any time there will not be any octets belonging to the second game older than 150 ms, as the scheduler discards them. There may, however, be octets belonging to the first game which are older than 150 ms. Without the AccelerationFactor, this would result in octets of the first game gaining priority over octets of the second game. By setting the AccelerationFactor of each application inversely proportional to the respective DelayBound settings, the scheduler may normalize this undesired affect.

The AccelerationOffset is a per flow based defined parameter. The AcceleratoinOffset value may be set to an integer multiple of the largest value the AccelerationFactor may take. This largest value is independent of the flows and may be determined by the software implementation. As an example, among two flows, one with an AccelerationOffset of zero and the other with a positive AccelerationOffset, the latter flow's octets will be included in any candidate transmission instance before any octets of the former flow, assuming both flows are DRC compatible with the transmission format of the given candidate instance.

For the bit metric, the polynomial coefficient for the priority state is set to a constant value as follows:

$DS_{BM}$=DSBitMetricValue wherein the DSBitMetricValue is a per flow defined parameter used for soft prioritization. Additionally, when two applications having approximately equal priority, but having different average incoming throughput (e.g., from Internet to the queue), the DSBitMetricValue for each flow may be set inversely with respect to the flow's typical throughput so as to avoid the application with the higher throughput gaining priority merely by having more data to efficiently fill FL packets.

Each traffic flow is classified into throughput sensitive class or delay sensitive class based on FlowClass parameter. Then bit metric MCX (where X is an element of $\{0, \ldots, 7\}$) is defined as follows:

$$MCX = \begin{cases} TS_{BM}, & \text{if } FlowClass = ThrputSensitive \\ DS_{BM}, & \text{if } FlowClass = DelaySensitive \end{cases}$$

Similarly, bit stuffing metric is defined as:

$$MCX = \begin{cases} TS_{BSM}, & \text{if } FlowClass = ThrputSensitive \\ DS_{BSM}, & \text{if } FlowClass = DelaySensitive \end{cases}$$

In one embodiment, the scheduler is implemented at least partially as a software implementation. According to this embodiment, the bit stuffing metrics are represented by 16 bit quantities which may be denoted as [B15 . . . B0]. The three most significant bits determine the priority state (e.g., "000" maps to MC0 and "111" maps to MC7). The remaining 13 least significant bits hold the coefficient value itself. With this representation, comparison operations between bit stuffing metrics may be directly performed between these 16 bit quantities.

The bit metrics are not explicitly represented in the software implementation, as information may be derived from the bit stuffing metric. The priority state of a bit metric is the same as that of the bit stuffing metric.

The packet metric of a candidate transmission instance is calculated by application of:

$$PacketMetric[k] = \frac{1}{Span[k]} \sum_{i \in P[k]} BitMetric[i]$$

as described hereinabove. Note, even though only one term of the bit metric of an octet may be nonzero, in general, coefficients of the resulting packet metric may be nonzero.

Many DRCs are compatible with noncanonical single-user formats with smaller payload sizes, therefore it is not desirable to convert single-user candidates into multi-user formats to achieve ARQ gains.

If the winning candidate transmission instance in the selection step of the scheduler is of multi-user format, only the conversion of the (1024,4,256) format to any of the three formats ({128,256,512},4,256) are supported in the present embodiment (i.e., the lowest rate format that may carry the selected data octets is used).

The discussion of bit and bit stuffing metrics given hereinabove considers the general case where each octet in each queue is assigned an individual metric. The metric is then recalculated each slot. Alternate embodiments reduce the complexity of such calculation(s). Assuming the queues are ordered by timestamp, one embodiment calculates one bit (stuffing) metric per flow based on the oldest timestamp among the head-of-the-queue octets of the queues of the flow. This metric may then be used for currently pending octets of the flow. Such simplification, assumes the metric to be a monotonically increasing function of the CurrentDelay of an octet. Otherwise, there is a risk the head-of-the-queue octet may prevent consecutive octets from being served. With this simplification, the bit stuffing metric may also be referred to as a flow metric.

In addition, any head-of-the-queue octet pending in the RTx queue of a flow is likely to be older than any head-of-the-queue octets that may be pending in the FTx and DARQ queues. Similarly, any head-of-the-queue octet that may be pending in the DARQ queue is likely to be older than the head-of-the-queue octet of the FTx queue. For this reason, rather than finding the oldest timestamp among these three queues, one embodiment uses a fixed order of RTx, DARQ, and then FTx queues to find the first nonempty queue for determining the timestamp to be used in metric calculation for the flow. The queues of the flow may also be served in the order of RTx, DARQ, and then FTx.

According to one embodiment, scheduling such as illustrated in FIG. 10 is performed whenever the FL is available for a new transmission. Note, specific implementations may perform some or all of the computations on every slot, including non-available slots. This is because by the time the access network determines the FL is available for a new transmission, there is usually not much time left to carry out the calculations involved in the scheduling method to determine a transmission instance.

The scheduler method illustrated in FIG. 10 consists of the four basic steps: 1) generation of a set of candidate transmission instances; 2) selection of one candidate among the set; 3) packing efficiency maximization; and 4) a priori or PACK calculation. The calculation of PACK determines a probability of an AT having successfully decoded a packet.

Referring again to FIG. 10, at step 504 the scheduler generates a list of candidate transmission instances. A candidate single-user transmission instance with a single-user format corresponding to each available user, wherein an available user is one not currently prohibited from service by the protocol subtype for any reason. Furthermore, the received DRC from the user is to be non-NULL, otherwise, the user will have negotiated a MAC layer protocol allowing one or more transmission format be served upon NULL DRC. If a candidate transmission instance is created for a user from which a NULL DRC has been received, the candidate instance is only allowed to carry data belonging to a flow with a finite Delay-Bound and only from the FTx queue of the flow. The transmission format of the candidate instance is the canonical format corresponding to the user's DRC as detailed in Table 1.

A candidate multi-user transmission instance is generated for each of the five multi-user transmission formats: (1024, 4,256), (2048,4,128), (3072,2,64), (4096,2,64), and (5120,2, 64). Those users having requested 153.6 Kbps or higher are served in multi-user formats. In addition, the DRC of a user is to be compatible with the format of the candidate transmission instance. Furthermore, a multi-user candidate transmission instance will satisfy one or both of the following conditions, or otherwise it is discarded from further consideration; it will carry the data of two or more users, or at least one user's data who's DRC was erased.

A candidate transmission instance in any of the groups is generated by stuffing bits from one or more flows, wherein: 1) single-user formats may only be stuffed with bits from the same user's flows; 2) multi-user formats are stuffed with bits from the flows of users with compatible DRCs.

The bit stuffing is performed in descending order of bit stuffing metrics. As mentioned hereinabove, computational requirements may result in computation of one bit stuffing metric per flow, which is then used for currently pending octets in queues of the flow. In this case, the bit stuffing metric helps to determine which flows will be served first; however, it does not determine how the octets of a given flow will be served. This assumes the octets pending in a flow's queues appear in the order of timestamp, and the octets of a flow are served in the order they appear in the queues.

This is used for FTx queues, but not necessarily for RTx/DARQ queues.

As mentioned hereinabove, each flow may have multiple queues, one queue for first-time transmitted data (FTx), and other queues for retransmissions (RTx queue for RLP retransmissions and/or a DARQ queue for MAC layer retransmissions). If a flow has nonempty RTx and/or DARQ queues, the bit stuffing metric for the flow is calculated based on the oldest of the head-of-the-queue timestamps among any of the nonempty FTx/RTx/DARQ queues. Only one bit stuffing metric is calculated for queues of a flow. Bit stuffing from a given flow should also be performed based on the ascending order of head-of-the-queue timestamps among the FTx/RTx/DARQ queues.

The timestamp-based ordering of the queues of a flow may be approximated as a fixed order of RTx/DARQ/FTx queues.

Note, in generating candidate transmission instances, non-canonical single-user formats and short multi-user formats that carry less than 1024 bits are not considered.

These formats will be considered in the packing efficiency maximization step. The scheduling method seeks to reduce complexity and pack as much data as possible per packet.

To avoid the situation of a user having weak channel condition but a large amount of data for transmission gain relative priority by filling short packets efficiently. Another benefit of not considering noncanonical and short packets in this stage includes, but is not limited to, avoiding certain quantization effects that may arise in frame-based scheduling.

In creating multi-user candidates, it is possible to take further precautions to alleviate potentially adverse effects of the continuation problem discussed hereinbelow. One such method is to avoid serving a multi-user packet on the same interlace with a previously started and ended multi-user packet for a certain number of slots (e.g., counted on the given interlace) following the start of the first multi-user packet. This number of slots may be set to the minimum of the spans of the two multi-user packets or possibly to the span of the first multi-user packet. This approach helps enable users to quickly become eligible to be served in a new multi-user packet, thus avoiding long runs of ineligibility.

With respect to step 508, after the list of single-user and multi-user candidate transmission instances is created, the scheduler selects one of these candidates (assuming the above generated list contains at least one candidate transmission instance). This is done by computing the packet metric for each of the candidates in the list, and selecting the candidate with the largest packet metric as the winning candidate. If ties occur, it is desirable to prefer single-user formats over multi-user formats. Also, it is desirable to pick higher-rate multi-user formats over lower-rate multi-user formats.

In step 510, the transmission format of the winning candidate transmission instance is reconsidered and may be changed to maximize its packing efficiency without changing the set of data octets selected to be carried by it. Completion of step 510 thus may provide ARQ gains.

If the winning candidate transmission instance is of single-user format, then the format may be converted to the lowest rate noncanonical single-user format that is compatible with the served user's DRC which may carry the selected data octets. Other embodiments may also change the format of a single-user transmission instance to a multi-user format.

The adaptive rate control mechanism inside the AT is likely to adapted to support single user packets. Many DRCs are compatible with noncanonical single-user formats with smaller payload sizes; therefore, it is not desirable to convert single-user candidates into multi-user formats to achieve ARQ gains.

Although multi-user formats may be converted to any of the lower rate multi-user formats (as long as the payload fits), it is advisable to avoid such widespread format conversions due to the potentially adverse effects of the continuation problem described hereinbelow.

Referring to FIG. 12, the scheduler may determine a maximum number of slots (e.g., less than the nominal span of the selected transmission instance) beyond which it will not transmit the transmission instance even though it may not detect ACKs from users served in the transmission instance. As this step is optional, it may be turned off so that the access network terminates the packet transmission after detecting an ACK from users served in the packet, or after transmitting the full span of the packet.

One method of implementing this step is to set the maximum number of slots of the transmission instance to:

$$\text{MaximumSpan} = \min(\text{ScheduledTxFormatSpan}, \max_{i \in \text{ServedUsers}}(DRC\text{Span}[i]))$$

wherein the ScheduledTxFormatSpan is the span of the scheduled transmission format, and the DRCSpan[i] is the span of the canonical transmission format corresponding to the decoded DRC from the i'th served user in the packet.

Several of the parameters utilized by the scheduler have been discussed hereinabove. Here is presented the parameters provided to the scheduler at the DSP-Driver interface. Global parameters refer to those parameters which apply to all flows, and Flow parameters refers to those parameters specified for each flow separately:

1. Global parameters:
    a. FlowTPutFilterTimeConst—defines the time constant of the first-order IIR filter used to generate the average throughput, AvgThroughput, variable that is kept for each flow. The filter is iterated once every slot. The input to the filter is the number of octets served from queues of the given flow in a packet that starts in that slot. The filter is updated with zero input in slots in which no new packet transmission starts.
    b. Thrghpt2DelayConvFactorBM—Conversion factor for throughput sensitive metric to delay sensitive metric for bit metric calculation
    c. Thrghpt2DelayConvFactorBSM—Conversion factor for throughput sensitive metric to delay sensitive metric for bit stuffing metric calculation
    d. FlowClass—Describes if the flow is throughput sensitive type or delay sensitive type
    e. FlowEligibleForDRCErasureMapping—to be used by DRC erasure mapping algorithm
    f. ErasureMapDelayThreshold—to be used by DRC erasure mapping algorithm
2. Flow parameters
    a. UserId, FlowId—provide a means for indexing and determining the owner of each flow
    b. QoSMetricState, PriorityThold[2]—these describe the priority state of the bit (stuffing) metric as a function of the current delay. The elements of the PriorityThold[ ] array are structures that contain the variables DelayThold and QoSMetricState. When CurrentDelay of a flow is less than PriorityThold[0].DelayThold, the priority state is set to QoSMetricState. If CurrentDelay is greater than PriorityThold[0].DelayThold, but less than PriorityThold[1].DelayThold, then the priority state is set to PriorityThold[0].QoSMetricState. If the CurrentDelay is larger than PriorityThold[1].DelayThold, then the priority state is set to PriorityThold[1].QoSMetricState. The QoSMetricState variables take on values $\{0, \ldots, 7\}$ corresponding to the priority states of $\{MC0, \ldots, MC7\}$ respectively.
    c. AccelerationFactor
    d. AccelerationOffset
    e. DelayBound—0 represents infinity, (i.e., never discard an octet before serving it): otherwise, it represents the amount of delay, relative to the timestamp of a given octet, after which the octet is discarded from a queue.
    f. TargetThroughput—A parameter used in the bit (stuffing) metric of throughput sensitive flows;
    g. FlowAggregateIndex—flows with FlowAggregateIndex set to 0 are not aggregated by the scheduler. Otherwise, flows with the same (nonzero) value of the FlowAggregateIndex are aggregated at the scheduler. The scope of the FlowAggregateIndex is limited to a user, i.e., the same index may be reused for flows of another user without confusion.
    h. IntraFlowPriority—contributing flows in an aggregated flow (by the scheduler) are served in the order of IntraFlowPriority. Among the contributing flows with the same IntraFlowPriority, the order is determined by the timestamp of the contributing flow.
    i. GoSFactor—used to provide levels of grade of service among flows.
    j. DSBitMetricValue—value of the bit metric coefficient in priority states in MCX.

Note, in the DSP-Driver interface, flows are not specified as BE, AF, EF, or by any other high-level descriptor. Rather, the DSP-Driver interface uses a uniform and low-level description for all flows. At higher level, such as at the BSC, specific high-level descriptors of flows, such as QoS requirements and BE/EF/AF categorizations, are to be mapped to the basic parameters defined in the DSP-Driver interface for each flow. Such mapping tables are generated for conceivable flow types by sufficient simulation and testing.

The following are examples illustrating the use of various parameters. For BE flows, the following parameters may be used:
    a. QoSMetricState=0 (MC0)
    b. PriorityThold[ ].QoSMetricState={any, any}
    c. PriorityThold[ ].DelayThold={0, 0} (Infinite)
    d. DelayBound=0 (Infinite).
    e. TargetThroughput=0.
    f. FlowAggregateIndex=1 (aggregate all BE flows of a user).

g. Thrghpt2DelayConvFactorBM=16.
h. Thrghpt2DelayConvFactorBSM=128.
i. FlowClass=ThrputSensitive.
j. FlowEligibleForDRCErasureMapping=0.
k. ErasureMapDelayThreshold=0 {infinite}
For AF flows, the following parameters may be used:
a. QoSMetricState=0 (MC0)
b. PriorityThold[ ].QOSMetricState={any, any}
c. PriorityThold[ ].DelayThold={0, 0} (Infinite)
d. DelayBound=0 (Infinite)
e. TargetThroughput=A positive value
f. FlowAggregateIndex=0 (no aggregation)
g. Thrghpt2DelayConvFactorBM=16.
h. Thrghpt2DelayConvFactorBSM=128.
i. FlowClass=ThrputSensitive.
j. FlowEligibleForDRCErasureMapping=0.
k. ErasureMapDelayThreshold=0 {infinite}
For EF Flows, the following parameters may be used:
a. QoSMetricState=0 (MC0)
b. PriorityThold[ ].QOSMetricState={2, 3}
c. PriorityThold[ ].DelayThold={0.25*DelayBound, 0.5*DelayBound}
d. DelayBound=Application dependent
e. TargetThroughput=0
f. FlowAggregateIndex=0 (no aggregation)
g. Thrghpt2DelayConvFactorBM=1.
h. Thrghpt2DelayConvFactorBSM=1.
i. FlowClass=DelaySensitive.
j. FlowEligibleForDRCErasureMapping=1.
k. ErasureMapDelayThreshold=0.25*DelayBound.
A Signaling Flow is provided as follows:
a. QoSMetricState=7 (MC7, highest priority)
b. PriorityThold[ ].QOSMetricState={7, 7}
c. PriorityThold[ ].DelayThold={0, 0} (Infinite)
d. DelayBound=0 (Infinite)
e. TargetThroughput=0
f. AggregateIndex=0 (no aggregation)
g. Thrghpt2DelayConvFactorBM=1.
h. Thrghpt2DelayConvFactorBSM=1.
i. FlowClass=DelaySensitive.
j. FlowEligibleForDRCErasureMapping=1.
k. ErasureMapDelayThreshold=0.25*DelayBound.

The BE/AF flows may be prioritized by using an appropriate combination of the following parameters:
1. MC0, . . . , MC7 states allow strict prioritization.
2. GoSFactor for soft prioritization
3. TargetThroughput typically, for AF flows that require some minimum throughput The EF flows may be further prioritized by using an appropriate combination of the following parameters:
1. MC0, . . . , MC7 states allow strict prioritization.
2. AccelerationOffset provides prioritization during bit stuffing among octets of the same priority state, but does not directly affect the final packet selection (since this latter step uses bit metrics to calculate the packet metric, which does not depend on the AccelerationOffset). When two flows belonging to the same user or two different users are competing to be included in the same candidate transmission instance, the flow with the larger AccelerationOffset receives priority.
3. DSBitMetricValue affects the bit metrics so it has a direct effect on the packet metric. This parameter may also be used for soft prioritization. Currently, this parameter is not implemented.

The DSP-Driver interface provides a flexible method of aggregating flows at the scheduler. Note, the aggregations performed by the scheduler are different from the aggregations that may be done by the BSC. When the BSC aggregates a set of flows, this aggregate appears as a single flow to the scheduler, and the scheduler receives a single set of parameters for the flow. The scheduler cannot tell the contributing flows apart. When aggregation is done at the scheduler, the scheduler will naturally know the contributing flows.

The AvgThroughput variable includes the total throughput of the aggregate. Certain parameters, such as the Delay-Bound, specified for contributing flows of an aggregate are set to the same value on the DSP-Driver interface. The list of variables to be set equal for all contributing flows are:
a. UserID
b. AggregateIndex
c. QoSMetricState
d. PriorityThold[2]
e. AccelerationFactor
f. AccelerationOffset
g. DelayBound
h. TargetThroughput
i. GoSFactor
j. DSBitMetricValue A parameters which may be set differently is IntraFlowPriority and a parameter which is to be set differently is FlowID.

In one embodiment, an aggregated flow is assigned a single bit (stuffing) metric. This metric is based on the oldest timestamp among contributing flows of an aggregated flow. The timestamp of a contributing flow is calculated based on the head-of-the-queue timestamps of its FTx/RTx/DARQ queues. When a flow is selected for bit stuffing, however, the order in which contributing flows are served is determined primarily by the IntraFlowPriority parameters assigned to each of the contributing flows, and secondarily by the timestamps of the contributing flows. By setting the IntraFlowPriority parameters to the same value, the selection order of contributing flows may be made strictly based on their timestamps. The IntraFlowPriority parameter is mostly intended for BE flows.

As discussed hereinabove, each flow has an FTx queue, and may have RTx and/or DARQ queues. In the software implementation, a single bit stuffing metric is calculated for each flow. This metric applies to octets in the FTx queue, as well as octets in the RTx and DARQ queues. If a flow is selected to be served, individual queues are also served in the order determined.

One software embodiment provides the ability to increase the priority of a flow if the RTx and/or DARQ queues are nonempty. This is accomplished by simply modifying the MetricTS value given in Equation (3.3-2) as:

$$Metric_{TS} = \frac{GoSFactor * RetransmissionPriorityFactor}{\max(\varepsilon, AvgThroughput - TargetThroughput)}$$

The factor RetransmissionPriorityFactor takes on the value of 1 if both the RTx and DARQ queues are empty. It takes on another value if the RTx queue is empty but the DARQ queue contains data. And, yet another value if the RTx queue is nonempty.

In Revision A of the 1xEV-DO specification, certain protocol subtypes define the NULL DRC to be compatible with a set of single-user and multi-user transmission formats. Also, in Rel-0 of the specification, configuration attributes are defined for certain protocol subtypes that enable the access network to serve a user from which a NULL DRC was received with a (1024,16,1024) single-user transmission format.

In either case, the scheduler may create a candidate transmission instance containing data for a user from which a NULL DRC was received. This is referred to as NULL-to-Rate conversion. The scheduler imposes the following restrictions on NULL-to-Rate conversions:

a. Allowed to serve flows with finite DelayBound
b. RTx/DARQ queues cannot be served Other than these restrictions, the scheduler does not distinguish whether the received DRC from the user was 0x0, (i.e., NULL DRC), or 0x1, (i.e., 38.4 Kbps), both of which are defined to be compatible with the same transmission formats in certain protocol subtypes in Rev-A. Again reference is made to Table 1 for specific protocol subtype definitions.

When a NULL DRC is received from a user, there is no guarantee that the served packet will be successfully decoded by the user. A future improvement may involve actually monitoring if users having sent a NULL DRC and which were then served in a packet are actually reasonably successfully decoding. Depending on the success statistics, the conversion may be turned on/off for the flow. One embodiment ranks the candidate transmission instances created for users that sent a NULL DRC lower than the candidate transmission instances created for users that sent DRC of 0x1.

Certain reasonable approximations may be made in a software implementation to facilitate the creation of the candidate multi-user instances that contain data for throughput sensitive flows.

With respect to scheduler timing, the timeline within a slot is divided into two parts; the first part is the noncritical segment, and the latter part is the critical segment. The DRC values of the users become available during the critical segment. However, the critical segment may not provide enough processor cycles to carry out computations involved in the scheduler under worst-case loading. Therefore, some of these calculations are to be delegated to the noncritical segment. Since the DRC values of some users may not be known during the noncritical segment, the software implementation uses the DRC values of the previous slot to build candidate transmission instances and to select the winning candidate. It is possible the DRC values of some users may change, and the winning candidate may become invalid during the critical segment. To overcome this problem, more than one strong candidate is selected during the noncritical segment. When the actual DRC values are received in the critical segment, this reduced set of candidates are reevaluated. The reduced set of candidate instances may contain:

a. A small number of (e.g., five) single-user candidates
b. One multi-user candidate (if any created) with a few spare users that may be served in that candidate if some of the users served in the candidate become incompatible In 1xEV-DO Rel. 0, an AN does not schedule packets to an AT when DRC information is erased. When an AN is serving multiple ATs with nondelay-sensitive applications, e.g., best effort traffic, relatively large DRC erasure rates may be tolerated (e.g., when due to multi-user diversity) without loss of system capacity. When the DRC erasure rate is excessively high, the DRC lock bit would be set to zero by the AN, and then the AT may choose to hand off to another sector or switch to fixed rate mode. However, the DRC lock bit generation method has a built-in delay, which is at least partially due to filtering, to prevent unnecessary handoffs. Thus, relatively long run lengths of DRC erasures may still occur on the reverse link. For delay-sensitive applications, e.g., EF traffic, these erasures may result in unacceptable amounts of service outage. A DRC erasure mapping algorithm seeks to minimize service outages on the FL.

Figure 14:
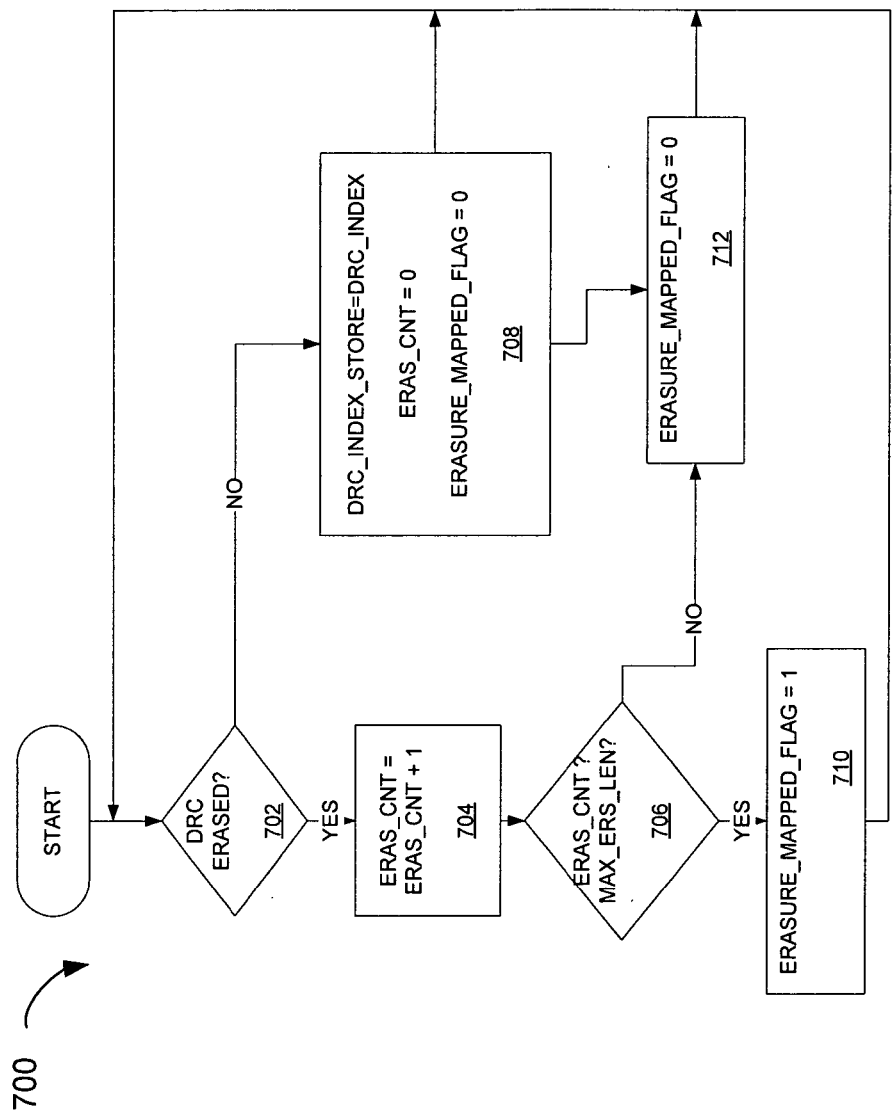
FIG. 14 illustrates a DRC erasure mapping algorithm according to an embodiment.

The baseline algorithm is described in two steps. The first step explains the decision on DRC erasure mapping. The second step describes the modifications to the FL scheduler of 1xEV-DO Revision A. FIG. 14 describes the DRC erasure mapping algorithm run by the AN at every time-slot interval for each AT that is in variable rate mode. For each AT, the algorithm is run at each sector of a cell which has an active queue, which is set up by the BSC, for that user. For simplicity the algorithm is described to run at each slot interval, but parameters would be updated only at every DRC_Length interval.

The main output of the algorithm is the Erasure_Mapped_flag, which indicates to the scheduler that the DRC erasure mapping is performed and limited FL scheduling may be performed for the AT.

The DRC_index_store is used for storing the latest valid, i.e. successfully decoded DRC index. Eras_Count is used for computing the run length of DRC erasures. DRC erasure mapping is performed only if erasure run length is greater than Max_Ers_Len. This threshold ensures the DRC erasure mapping is performed only when service outage probability is relatively high. Packets, however, may be scheduled to an AT when the corresponding FL packet delay is high. Thus Max_Ers_Len may not be too high. For EF flows, e.g., VoIP reasonable settings for Max_Ers_Len may be in the range of 0 to 16 slots.

As illustrated in FIG. 14, the method 700 first checks if the DRC is erased at decision diamond 702. If the DRC is erased, the Eras_Cnt is incremented at step 704. The Eras_Cnt is then compared to a maximum value, Max_Ers_Len at step 706. If Eras_Cnt is greater than Max_Ers_Len, the Erasure_Mapped_flag is set to 1; else, Erasure_Mapped_flag is cleared, i.e., set to 0 at step 712. If the DRC is not erased at decision diamond 702, the Erasure_Mapped_flag is set to 0, the Eras_Cnt is set to 0, and the DRC_Index_Store is set to DRC_Index at step 708. Processing continues to step 712, wherein Erasure_Mapped_flag is set to 0.

The FL schedulers described hereinabove may be modified to work with the DRC erasure mapping algorithm. For each distinct data flow of each AT, flow is eligible for limited FL scheduling if:

(ErasureMappedFlag==1 && FlowEligibleForDRCErasMapping==1 && HeadofQueueDelay≧ErasureMapDelayThreshold)

wherein FlowEligibleForDRCErasMapping is a parameter that indicates the eligibility of each traffic flow for DRC erasure mapping. As default EF flows are assumed eligible for mapping while BE and AF flows are not.

HeadofQueueDelay indicates the "Current_Delay" value for the packet at the front of the FL queue (i.e.: oldest packet in FTx, RTx or DARQ queue). ErasureMapDelayThreshold is the minimum required delay for the particular flow for erasure mapping (has a similar effect as the "PriorithyThold[i].DelayHold" in. If a flow is eligible for limited FL scheduling, the following modifications are performed on the FL scheduler:

a. Flow is not eligible as a candidate for single-user transmission instance
b. Flow is eligible for multi-user transmission instance with requested DRC index, DRC_index_mapped It is possible to dynamically change the DRC_index_mapped as a function of erasure length. This may be achieved by using DRC_index_store and Eras_Count. The default setting for DRC_index may be mapped to 0x3. For the FL scheduler, DRC index 0x3 would correspond to multi-user transmission format (1024,4,256), which may possibly be converted to formats ({128,256,512},4,256). All of these multi-user formats are compatible with all DRC indices, so the AT should be able to decode the mapped DRC as long as it has sufficient SINR (independent of the actual requested DRC index). Alternate algorithms may apply a more conservative which limits available multi-user transmission formats to lower data rates as Eras_Count increases.

Note, the DARQ option may be turned on for VoIP. So, in the event an AT has not decoded the transmitted multi-user packet in the first transmission attempt, DARQ provides the possibility of a second transmission attempt and reduces residual packet error rate. DARQ performance, however, is tied to ACK channel performance which may not be very reliable when DRC is in erasure. The ACK/NAK decision threshold may be optimized for DARQ, possibly depending on the DRC index or DRC mapping state. Another embodiment makes a DARQ transmission attempt compatible with only lower rate multi-user packet formats, e.g., (512,4,1024), or (256,4,1024), in the case of DRC erasure mapping.

Alternate embodiments may provide additional steps and means to the scheduler presented herein. For example, the BE/AF flows would typically utilize the priority states, which have strictly lower priority than the priority states. This may result in a degradation of BE/AF throughput in the presence of EF users, which would most likely use the higher priority states. The BE/AF throughput may be boosted by increasing the priority of the BE/AF flows to higher states under certain conditions.

According to one embodiment, the AvgRequestedRate is the filtered requested rate of a user, wherein K users are configured as BE users in the system. If a user's throughput for its BE flows, AvgThroughput satisfies:

$$AvgThroughput < \alpha/kAvgRequestedRate$$

then the user's priority state for its BE flows may be boosted to higher priority states. The value of $\alpha$ may be chosen depending on the EF load of the system, smaller $\alpha$ for higher load. Furthermore, minimum requested rate requirements may be imposed on the users for this promotion. Other methods for improving BE/AF capacity are possible.

The above method also suggests the priority state of a flow's bit (stuffing) metric may not only be a function of head-of-the-queue delay, but may also be a function of the flow's throughput.

Note, in delay sensitive states, the bit stuffing metric is strictly a function of delay, and it has no mechanism to take advantage of the local channel peaks of a user. Here, the bit stuffing metric value in delay sensitive states may be modified to read:

$$MBS_{DS}=AccelerationFactor*[CurrentDelay+\kappa CCI]+AccelerationOffset$$

wherein the Channel Condition Indicator (CCI) takes on values from the set {0, 1} or the interval [0,1], which may be generated separately, such that when it takes on higher values, it indicates relatively good channel conditions compared to the user's long-term channel condition. Also, K is the CCI-to-Delay conversion factor. It indicates how much boost in terms of delay the flow will get when the channel condition of the user is good relative to its own channel statistics.

One simple method to generate CCI for the binary {0, 1} case is given as follows. Let RateIndex be an integer assigned to the DRC values in increasing rate order, wherein the DRC value is not used because it is not monotonically increasing with the data rate. Let AvgRateIndex be the average (filtered) RateIndex of a user. Let CCIThreshold be a parameter such as 1.2. Then, if RateIndex>CCIThreshold*AvgRateIndex, the value of CCI may be set to unity. Otherwise, it is set to zero.

In this example, the CCI will indicate a relatively good channel condition if the current RateIndex corresponding to the received DRC is 120% or higher than average quality.

Preemption refers to the abortion of an FL transmission before it is decoded by destination users. Preemption may be used if very high priority data shows up while all four interlaces on the FL are occupied by relatively low-rate users. The scheduler algorithm does not currently provide a way of preempting ongoing transmissions. One reason for this is that unless carefully monitored, uncontrolled preemptions may lead to capacity loss.

The approach taken here is to avoid circumstances which may require preemption. One such condition is, as mentioned above, all four interlaces being occupied by low-rate users. To avoid this, simple methods may be utilized. One such method is not to allow more than a fixed number of simultaneous transmissions of formats with 16-slot and 8-slot spans. As an example, this number may be set to 2 or 3.

One embodiment monitors the decoding performance of users that transmit NULL DRC and are served in a packet. Depending on the PER measured over these NULL-to-rate cases, it is possible to turn on/off the NULL-to-rate conversions for each user. Similarly, it is also possible to turn on/off the restrictions on serving RTx/DARQ queues as well as the queues of flows with infinite DelayBound in NULL-to-rate instances, if the collected statistics indicate that the access terminal is sufficiently reliably decoding these packets.

The bit and bit stuffing metric coefficients for throughput sensitive flows provide proportional fairness in a BE-only system (e.g., TargetThroughput=0 and GoSFactor=1 for all flows) with users having large amounts of data to receive. The form of the metric coefficient may be applied in a similar manner to other schedulers. For this purpose, the metric coefficient for throughput sensitive flows may be expressed as:

$$Metric_{TS} = \frac{1}{f(AvgThroughput)\,h(AvgRequestedRate)}$$

wherein f(.) and h(.) are generic functions, and AvgRequestedRate is the average requested rate of a user. Setting f(x)=x and h(x)=x yields an approximately equal-GoS scheduler.

The Enhanced Forward Traffic Channel MAC Protocol defined in Revision A of the 1xEV-DO specification imposes a constraint on serving users following a multi-user packet as summarized below. The Revision A specification states that—Slot t is defined to be a continuation of an earlier slot s, if the following conditions are met:
  c. The access terminal is a potential target of a packet whose transmission begins in slot s.
  d. The slot t is in the same FL interlace as the slot s, i.e., t−s=0 (mod 4).
  e. s<t≤s+4N, where N denotes the Span of the DRC index corresponding to the DRC value that is in effect during slot s.
  f. Prior to slot t, the access network has not received a positive acknowledgment for the packet whose transmission began in slot s.

If the access terminal is a potential target of a packet transmitted by a sector starting in slot s, the access network shall not transmit a new packet from the same FL data source to the access terminal in any slot t that is a continuation of slot s.

The above stated restriction imposes constraints on which users may be served following a multi-user packet. As an example, if the access network serves a multi-user packet to a set of users which then early terminates, then the access network cannot serve any packets (single-user or multi-user) during the continuation of the served packet to users that were not served in the previous packet but were compatible with its format. In one situation the access network serves a 153.6 Kbps multi-user packet and users with data carried by it decode the packet in less than 4 slots. If the access network immediately serves another 153.6 Kbps multi-user packet on the same interlace, then the users that actually requested 153.6 Kbps or any DRC with a span of 4 slots but were not served in the previous packet, will not be allowed to be served in the new transmission. Therefore, only those users who requested DRCs with span less than 4 slots, i.e., typically users at better channel conditions, may be served in the new transmission. But this makes it even more likely for the new packet to decode early. This chain may continue until the queues of higher geometry users are drained. In the meanwhile, lower geometry users that are requesting DRCs with 4-slot spans will not be served. The result would be an excessive delay for lower geometry users and a possibly small gain in delay for higher geometry users.

Note, the embodiments, aspects and examples provided in the description hereinabove relate to systems supporting a high rate packet data protocol. Such system is presented for clarity and understanding of the ideas presented. Alternate systems may implement the method and means for adaptive delay management and scheduling presented herein.

Thus, a novel and improved method and apparatus for scheduling transmissions in a communications system has been described. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof. Those of skill would further appreciate that the various illustrative logical blocks, modules, circuits, and algorithm steps described in connection with the embodiments disclosed herein may be implemented as electronic hardware or combinations of electronic hardware and computer software. The various illustrative components, blocks, modules, circuits, and steps have been described generally in terms of their functionality. Whether the functionality is implemented as hardware or as a combination of hardware and software depends upon the particular application and design constraints imposed on the overall system. Skilled artisans recognize how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, programmable logic device, array of logic elements, or state machine. The software module could reside in RAM memory, flash memory, ROM memory, EPROM memory, EEPROM memory, registers, hard disk, a removable disk, a CDROM, or any other form of storage medium known in the art. An exemplary processor is advantageously coupled to the storage medium so as to read information from, and write information to, the storage medium. In the alternative, the storage medium may be integral to the processor. The processor and the storage medium may reside in an ASIC. The ASIC may reside in a telephone or other user terminal. In the alternative, the processor and the storage medium may reside in a telephone or other user terminal. The processor may be implemented as a combination of a DSP and a microprocessor, or as two microprocessors in conjunction with a DSP core, etc.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A method for scheduling transmission instances in a wireless communication system, comprising:
    receiving channel condition indicators at a receiver from a plurality of mobile users, wherein the channel condition indicators correspond to forward link communications;
    determining a delay criterion for the plurality of mobile users, wherein the delay criterion for the plurality of mobile users is based on data to be transmitted, the data being either high priority data or non-high priority data, the high priority data being delay sensitive and the non-high priority data being capacity sensitive; and
    determining a transmission schedule for a plurality of queues including data associated with the plurality of mobile users, wherein the high priority data is scheduled for transmission before the non-high priority data, the non-high priority data is scheduled based at least in part on the channel condition indicators and an age of the non-high priority data, and the transmission schedule is a function of the delay criterion and a plurality of bit metrics, wherein a bit metric is calculated for and assigned to each bit pending in each of the plurality of queues;
    wherein each bit metric is calculated based at least in part on whether the data in the associated queue is delay sensitive or throughput sensitive, wherein bit metrics for throughput sensitive flows are based on an inverse of a difference between an averaged total throughput of the flow and a target throughput of the flow.

2. The method of claim 1, further comprising:
    selecting a queue for incorporation into a transmission instance based at least in part on each bit metric associated with each bit pending in the queue.

3. The method of claim 1, wherein the transmission instance is a combination of a transmission format and a particular set of bits from the selected queue that may be carried by a packet of the transmission format.

4. The method of claim 1, wherein each bit metric of the plurality of bit metrics is represented by a polynomial with a plurality of terms, wherein each term of the polynomial includes a coefficient, and wherein only one term of the polynomial is nonzero at any given time.

5. A method for scheduling transmission instances in a wireless communication system, comprising:
    evaluating a plurality of transmission queues to identify delay sensitivity and throughput sensitivity of an application flow associated with each transmission queue;
    generating a set of candidate transmission instances from the plurality of transmission queues, wherein generating the set of candidate transmission instances comprises calculating a plurality of bit metrics, wherein a bit metric is calculated for and assigned to each bit pending in each of the plurality of queues, wherein bit metrics for throughput sensitive flows are based on an inverse of a difference between an averaged total throughput of the flow and a target throughput of the flow;

selecting one candidate transmission instance from the set; and preparing the selected candidate transmission instance for transmission by a transmitter.

6. The method as in claim 5, wherein selecting one candidate transmission instance comprises:

generating a packet metric as a function of the plurality of bit metrics; and comparing the packet metrics for candidate transmission instances in the set.

7. The method as in claim 5, wherein the throughput sensitivity is determined on a per flow per user basis.

8. An apparatus for scheduling transmission instances in a wireless communication system, comprising:

means for receiving channel condition indicators from a plurality of mobile users, wherein the channel condition indicators correspond to forward link communications;

means for determining a delay criterion for the plurality of mobile users, wherein the delay criterion for the plurality of mobile users is based on data to be transmitted, the data being either high priority data or non-high priority data, the high priority data being delay sensitive and the non-high priority data being capacity sensitive; and means for determining a transmission schedule for a plurality of queues including data associated with the plurality of mobile users, wherein the high priority data is scheduled for transmission before the non-high priority data, the non-high priority data is scheduled based at least in part on the channel condition indicators and an age of the non-high priority data, and the transmission schedule is a function of the delay criterion and a plurality of bit metrics, wherein a bit metric is calculated for and assigned to each bit pending in each of the plurality of queues;

wherein each bit metric is calculated based at least in part on whether the data in the associated queue is delay sensitive or throughput sensitive, wherein bit metrics for throughput sensitive flows are based on an inverse of a difference between an averaged total throughput of the flow and a target throughput of the flow.

9. An apparatus for scheduling transmission instances in a wireless communication system, comprising:

means for evaluating a plurality of transmission queues to identify delay sensitivity and throughput sensitivity of an application flow associated with each transmission queue;

means for generating a set of candidate transmission instances from the plurality of transmission queues, wherein the means for generating the set of candidate transmission instances comprises means for calculating a plurality of bit metrics, wherein a bit metric is calculated for and assigned to each bit pending in each of the plurality of queues, wherein bit metrics for throughput sensitive flows are based on an inverse of a difference between an averaged total throughput of the flow and a target throughput of the flow;

means for selecting one candidate transmission instance from the set; and preparing the selected candidate transmission instance for transmission.

10. The apparatus as in claim 9, wherein the means for selecting one candidate transmission instance comprises:

means for generating a packet metric as a function of the plurality of bit metrics; and means for comparing the packet metrics for candidate transmission instances in the set.

11. An apparatus for scheduling transmission instances in a wireless communication system, comprising:

a memory storage unit for storing transmission queues, each queue having an associated delay criterion, wherein the delay criterion is based on data to be transmitted, the data being either high priority data or non-high priority data, the high priority data being delay sensitive and the non-high priority data being capacity sensitive;

a queue select unit for selecting a transmission queue of the stored transmission queues as a function of the delay criterion, wherein queues with high priority data are scheduled for transmission before queues with non-high priority data, and the queues with non-high priority data are scheduled based at least in part on channel condition indicators and an age of the non-high priority data; and a bit metric calculation unit for calculating a plurality of bit metrics, wherein a bit metric is calculated for and assigned to each bit pending in each of the plurality of queues, and wherein each bit metric is calculated based at least in part on whether the data in the associated transmission queue is delay sensitive or throughput sensitive, wherein bit metrics for throughput sensitive flows are based on an inverse of a difference between an averaged total throughput of the flow and a target throughput of the flow.

12. The apparatus as in claim 11, wherein the queue select unit selects a transmission queue as a function of the bit metric associated with each transmission queue.

13. The apparatus as in claim 11, further comprising:

a bit stuffing metric calculation unit for calculating a bit stuffing metric for each transmission queue; and a candidate transmission instance unit for generating a set of candidate transmission instances as a function of the bit stuffing metrics, wherein each candidate transmission instance in the set is eligible for incorporation into a current transmission instance.

14. The apparatus as in claim 13, wherein a candidate transmission instance is eligible for incorporation into the current transmission instance when the candidate transmission instance may be transmitted in the format of the current transmission instance.

15. The apparatus as in claim 13, further comprising:

a packet metric calculation unit for generating a packet metric for each transmission queue; and a transmission instance select unit for selecting a transmission instance from the set of candidate transmission instances based on the packet metric values.

16. The apparatus as in claim 15, wherein the packet metric comprises an accumulation of the bit metrics associated with each transmission queue.

17. The apparatus as in claim 16, wherein the packet metric is calculated as:

$$PacketMetric = AccumulatedBitMetric/Ng$$

wherein Ng is the generic span of a candidate transmission instance and the AccumulatedBitMetric is a sum of the bit metrics corresponding to all bits included in the candidate instance.

18. The apparatus as in claim 16, wherein the packet metric is calculated as:

$$PacketMetric[k] = \frac{1}{Span[k]} \sum_{i \in P[k]} BitMetric[i]$$

wherein k represents an index to a candidate transmission instance, Span[k] represents a span for a corresponding transmission format, P[k] represents a set of octets included in the candidate transmission instance, and BitMetric[i] represents a bit metric of the $i^{th}$ octet included in the candidate transmission instance.

19. The apparatus as in claim 16, wherein the packet metric is an estimate of instantaneous throughput of the bit metric for transmission of the candidate transmission instance.

20. The apparatus as in claim 11, further comprising:
a queue select unit to select transmission queues for a transmission instance.

21. The apparatus as in claim 20, wherein each queue has an associated quality of service indicator and an associated delay criterion.

22. The apparatus as in claim 21, wherein the quality of service indicator and delay criterion are stored in the memory storage unit with each transmission queue.

23. The apparatus as in claim 20, wherein the queue select unit selects a transmission queue as a function of the bit metric associated with the transmission queue.

24. The apparatus as in claim 11, wherein each queue has a fixed delay bound.

25. The apparatus as in claim 24, wherein delay is measured as time a queue is stored in the memory storage unit.

26. The apparatus as in claim 25, wherein each delay bound is a function of a fraction of expedited forwarding users.

27. The apparatus as in claim 26, wherein each queue has at least one time stamp, and
wherein delay is measured as time elapsed from the one of the at least one time stamp.

28. The apparatus as in claim 27, wherein a timestamp is applied to each octet in a queue.

29. The apparatus as in claim 11, wherein the quality of service indicator identifies a queue as one of:
a best effort flow having a high end-to-end delay tolerance; and
an expedited forwarding flow having low delay tolerance.

30. The apparatus as in claim 29, wherein the quality of service indicator further identifies a queue as one of:
a best effort flow having a high end-to-end delay tolerance;
an expedited forwarding flow having low delay tolerance; and
an assured forwarding flow having a high delay tolerance with a target average throughput.

31. The apparatus as in claim 11, wherein each queue has an associated flow class to identify sensitivity to throughput or sensitivity to delay.

32. The apparatus as in claim 11, wherein bits from at least one flow are stuffed to format a candidate transmission instance.

33. The apparatus as in claim 32, wherein the bit stuffing metrics are used for bit stuffing in descending order of bit stuffing metrics.

34. The apparatus as in claim 11, wherein if a selected transmission instance is in a single user format, the apparatus converts to the transmission instance to a lower rate available format.

35. The apparatus as in claim 11, wherein the wireless communication system supports multi-user formats, and
wherein if a selected transmission instance is a multi-user format, the apparatus applies a lower available multi-user format.

36. An apparatus for scheduling transmission instances in a wireless communication system, comprising:
a memory storage unit for storing transmission queues, each queue having an associated delay criterion; and
a queue select unit for selecting a transmission queue of the stored transmission queues as a function of the delay criterion and a plurality of bit metrics;
wherein each queue has an associated flow class to identify sensitivity to throughput or sensitivity to delay;
wherein the plurality of bit metrics comprises at least a first bit metric for a throughput sensitive flow calculated as:

$$TS_{BM} = \frac{GoSFactor \cdot Thrghpt2DelayConvFactorBM}{\max(\varepsilon, AvgThroughput - TargetThroughput)}$$

wherein GoSFactor is a per-flow based defined parameter to assign a grade of service to a flow, AvgThroughput is an averaged total throughput of the flow, TargetThroughput is defined for each flow, $\varepsilon$ is a small positive number, and Thrghpt2DelayConvFactorBM is a conversion factor applied to calculation of the first bit metric for the throughput sensitive flow.

37. The apparatus as in claim 36, wherein a first bit stuffing metric for the throughput sensitive flow is calculated as:

$$TS_{BSM} = \frac{GoSFactor \cdot Thrghpt2DelayConvFactorBSM}{\max(\varepsilon, AvgThroughput - TargetThroughput)}$$

wherein Thrghpt2DelayConvFactorBSM is a conversion factor applied to calculation of the first bit stuffing metric for the throughput sensitive flow.

38. The apparatus as in claim 37, wherein a second bit stuffing metric for a delay sensitive flow is calculated as:

$DS_{BSM}$=AccelerationFactor*CurrentDelay+AccelerationOffset wherein AccelerationFactor is a factor applied to the delay sensitive flow to normalize the delay bound, and AccelerationOffset is a function of the AccelerationFactor.

39. The apparatus as in claim 38, wherein the plurality of bit metrics comprises at least a second bit metric for the delay sensitive flow calculated as:

$DS_{BM}$=DSBitMetricValue wherein DSBitMetricValue is defined for the delay sensitive flow and used for soft prioritization.

40. An apparatus for scheduling transmission instances in a wireless communication system, comprising:
a memory storage unit for storing transmission queues, each queue having an associated delay criterion, wherein the delay criterion is based on data to be transmitted, the data being either high priority data or non-high priority data, the high priority data being delay sensitive and the non-high priority data being capacity sensitive; and
a controller configured to:
calculate a bit metric associated with each of the transmission queues, wherein each of the transmission queues stores an instance of an application flow, wherein the application flow is divided into a plurality of instances;

wherein each bit metric is calculated based at least in part on whether the data in the associated transmission queue is delay sensitive or throughput sensitive, wherein bit metrics for throughput sensitive flows are based on an inverse of a difference between an averaged total throughput of the flow and a target throughput of the flow;

select a packet type for a transmission instance;

determine an estimated throughput;

determine flows supporting the estimated throughput; and order flows according to the delay criterion and bit metrics, wherein queues with high priority data are scheduled for transmission before queues with non-high priority data, and the queues with non-high priority data are scheduled based at least in part on channel condition indicators and an age of the non-high priority data.

41. The apparatus as in claim 40, wherein the controller is further configured to:

select a packet type for a transmission instance by:

identifying a number of user bits in a packet for the packet type;

identifying a number of slots for the packet type; and calculating a ratio of the number of user bits in a packet to the number of slots for the packet type.

42. An apparatus for scheduling transmission instances in a wireless communication system, comprising:

memory storage unit for storing transmission queues, each queue having an associated delay criterion; and a controller configured to:

estimate throughput for flows stored in the transmission queues;

calculate a plurality of bit metrics, wherein a bit metric is calculated for and assigned to each bit pending in each of the plurality of queues;

wherein each bit metric is calculated based at least in part on whether the data in the associated transmission queue is delay sensitive or throughput sensitive, wherein bit metrics for throughput sensitive flows are based on an inverse of a difference between an averaged total throughput of the flow and a target throughput of the flow;

determine a quality of service priority for the flows;

sort according to quality of service priorities and bit metrics;

determine an order of flows based on estimated throughput for each flow; and select a flow available for transmission at a highest rate based on the determined order of flows.

43. The apparatus as in claim 42, wherein the controller is further configured to:

generate a packet available for transmission with a highest number of bits per slot.

44. A method for scheduling packet transmissions in a communication system, the method comprising:

receiving channel condition indicators at a receiver from a plurality of subscriber stations;

comparing the channel condition indicators;

determining delay performance targets for each of the plurality of subscriber stations in response to the comparison, wherein a higher delay performance target is associated with good channel conditions and a lower delay performance target is associated with poor channel conditions; and determining a transmission schedule for a plurality of queues including data associated with the plurality of subscriber stations as a function of the delay performance targets and a plurality of bit metrics, wherein a bit metric is calculated for and assigned to each bit pending in each of the plurality of queues;

wherein each bit metric is calculated based at least in part on whether the data in the associated queue is delay sensitive or throughput sensitive, wherein bit metrics for throughput sensitive flows are based on an inverse of a difference between an averaged total throughput of the flow and a target throughput of the flow.

45. The method of claim 44, wherein the channel condition indicators correspond to forward link communications to the subscriber stations.

46. The method of claim 44, wherein the channel condition indicators are proportional to the channel conditions.

47. The method of claim 44, further comprising:

receiving a delay parameter for each of the plurality of subscriber stations;

receiving queue state information for each of the plurality of subscriber stations; and wherein the transmission schedule is determined as a function of the delay parameter and the queue state information.

48. The method of claim 47, wherein each delay parameter is a function of a quality of service index associated with each subscriber station.

49. The method of claim 47, wherein the queue state information includes age of the data pending in each queue.

50. A machine-readable medium being a non-transitory medium having instructions for execution by a processor for scheduling transmission instances in a wireless communication system, the instructions comprising code for:

evaluating a plurality of transmission queues to identify delay sensitivity and throughput sensitivity of an application flow associated with each transmission queue;

generating a set of candidate transmission instances from the plurality of transmission queues, wherein generating the set of candidate transmission instances comprises calculating a plurality of bit metrics, wherein a bit metric is calculated for and assigned to each bit pending in each of the plurality of queues, wherein bit metrics for throughput sensitive flows are based on an inverse of a difference between an averaged total throughput of the flow and a target throughput of the flow;

selecting one candidate transmission instance from the set; and preparing the selected candidate transmission instance for transmission.

51. A machine-readable medium being a non-transitory medium having instructions for execution by a processor for scheduling transmission instances in a wireless communication system, the instructions comprising code for:

receiving channel condition indicators from a plurality of mobile users, wherein the channel condition indicators correspond to forward link communications;

determining a delay criterion for the plurality of mobile users, wherein the delay criterion for the plurality of mobile users is based on data to be transmitted, the data being either high priority data or non-high priority data, the high priority data being delay sensitive and the non-high priority data being capacity sensitive; and determining a transmission schedule for a plurality of queues including data associated with the plurality of mobile users, wherein the high priority data is scheduled for transmission before the non-high priority data, the non-high priority data is scheduled based at least in part on the channel condition indicators and an age of the non-high priority data, and the transmission schedule is a function of the delay criterion and a plurality of bit metrics, wherein a bit metric is calculated for and assigned to each bit pending in each of the plurality of queues;

wherein each bit metric is calculated based at least in part on whether the data in the associated queue is delay sensitive or throughput sensitive, wherein bit metrics for throughput sensitive flows are based on an inverse of a difference between an averaged total throughput of the flow and a target throughput of the flow.

52. A machine-readable medium being a non-transitory medium having instructions for execution by a processor for scheduling transmission instances in a wireless communication system, the instructions comprising code for:

storing transmission queues, each queue having an associated delay criterion;

calculating a plurality of bit metrics, wherein a bit metric is calculated for and assigned to each bit pending in each of the plurality of queues;

wherein each bit metric is calculated based at least in part on whether the data in the associated transmission queue is delay sensitive or throughput sensitive, wherein bit metrics for throughput sensitive flows are based on an inverse of a difference between an averaged total throughput of the flow and a target throughput of the flow;

estimating throughput for flows stored in the transmission queues;

determining a quality of service priority for the flows;

sorting according to quality of service priorities;

determining an order of flows based on estimated throughput for each flow; and selecting a flow available for transmission at a highest rate based on the determined order of flows and bit metrics.

53. A machine-readable medium being a non-transitory medium having instructions for execution by a processor for scheduling packet transmissions in a communication system, the instructions comprising code for:

receiving channel condition indicators from a plurality of subscriber stations;

comparing the channel condition indicators;

determining delay performance targets for each of the plurality of subscriber stations in response to the comparison, wherein a higher delay performance target is associated with good channel conditions and a lower delay performance target is associated with poor channel conditions; and determining a transmission schedule for a plurality of queues including data associated with the plurality of subscriber stations as a function of the delay performance targets and a plurality of bit metrics, wherein a bit metric is calculated for and assigned to each bit pending in each of the plurality of queues;

wherein each bit metric is calculated based at least in part on whether the data in the associated queue is delay sensitive or throughput sensitive, wherein bit metrics for throughput sensitive flows are based on an inverse of a difference between an averaged total throughput of the flow and a target throughput of the flow.

54. A machine-readable medium being a non-transitory medium having instructions for execution by a processor for scheduling transmission instances in a wireless communication system, the instructions comprising code for:

storing transmission queues, each queue having an associated delay criterion, wherein the delay criterion is based on data to be transmitted, the data being either high priority data or non-high priority data, the high priority data being delay sensitive and the non-high priority data being capacity sensitive; and selecting a transmission queue from the stored transmission queues as a function of the delay criterion and a plurality of bit metrics, wherein a bit metric is calculated for and assigned to each bit pending in each of the plurality of queues, wherein queues with high priority data are scheduled for transmission before queues with non-high priority data, and the queues with non-high priority data are scheduled based at least in part on channel condition indicators and an age of the non-high priority data;

wherein each bit metric is calculated based at least in part on whether the data in the associated transmission queue is delay sensitive or throughput sensitive, wherein bit metrics for throughput sensitive flows are based on an inverse of a difference between an averaged total throughput of the flow and a target throughput of the flow.

55. A method for scheduling transmission instances in a wireless communication system comprising:

storing transmission queues at a base station, each queue having an associated delay criterion, wherein the delay criterion, is based on data to be transmitted, the data being either high priority data or non-high priority data, the high priority data being delay sensitive and the non-high priority data being capacity sensitive; and selecting a transmission queue from the stored transmission queues as a function of the delay criterion and a plurality of bit metrics, wherein a bit metric is calculated for and assigned to each bit pending in each of the plurality of queues, wherein queues with high priority data are scheduled for transmission before queues with non-high priority data, and the queues with non-high priority data are scheduled based at least in part on channel condition indicators and an age of the non-high priority data;

wherein each bit metric is calculated based at least in part on whether the data in the associated transmission queue is delay sensitive or throughput sensitive, wherein bit metrics for throughput sensitive flows are based on an inverse of a difference between an averaged total throughput of the flow and a target throughput of the flow.

56. A method for scheduling transmission instances in a wireless communication system comprising:

storing transmission queues at a base station, each queue having an associated delay criterion;

calculating a plurality of bit metrics, wherein a bit metric is calculated for and assigned to each bit pending in each of the plurality of queues;

wherein each bit metric is calculated based at least in part on whether the data in the associated transmission queue is delay sensitive or throughput sensitive, wherein bit metrics for throughput sensitive flows are based on an inverse of a difference between an averaged total throughput of the flow and a target throughput of the flow;

estimating throughput for flows stored in the transmission queues;

determining a quality of service priority for the flows;

sorting according to quality of service priorities;

determining an order of flows based on estimated throughput for each flow and bit metrics; and selecting a flow available for transmission at a highest rate based on the determined order of flows.

57. An apparatus for scheduling packet transmissions in a communication system, comprising:
- a receiver module for receiving channel condition indicators from a plurality of subscriber stations;
- a comparator module for comparing the channel condition indicators; a delay performance module for determining delay performance targets for each of the plurality of subscriber stations in response to the comparison, wherein a higher delay performance target is associated with good channel conditions and a lower delay performance target is associated with poor channel conditions;
- a bit metric module for calculating a plurality of bit metrics, wherein a bit metric is calculated for and assigned to each bit pending in each of the plurality of queues, the plurality of queues being associated with the plurality of subscriber stations;
- wherein each bit metric is calculated based at least in part on whether the data in the associated queue is delay sensitive or throughput sensitive, wherein bit metrics for throughput sensitive flows are based on an inverse of a difference between an averaged total throughput of the flow and a target throughput of the flow; and
- a schedule module for determining a transmission schedule for each the plurality of subscriber stations as a function of the delay performance targets and bit metrics.

58. An apparatus for scheduling packet transmissions in a communication system comprising:
- means for receiving channel condition indicators from a plurality of subscriber stations;
- means for comparing the channel condition indicators;
- means for determining delay performance targets for each of the plurality of subscriber stations in response to the comparison, wherein a higher delay performance target is associated with good channel conditions and a lower delay performance target is associated with poor channel conditions;
- means for calculating a plurality of bit metrics, wherein a bit metric is calculated for and assigned to each bit pending in each of the plurality of queues, the plurality of queues being associated with the plurality of subscriber stations;
- wherein each bit metric is calculated based at least in part on whether the data in the associated transmission queue is delay sensitive or throughput sensitive, wherein bit metrics for throughput sensitive flows are based on an inverse of a difference between an averaged total throughput of the flow and a target throughput of the flow; and
- means for determining a transmission schedule for each the plurality of subscriber stations as a function of the delay performance targets and bit metrics.

* * * * *